United States Patent
Hu et al.

(10) Patent No.: US 10,148,468 B2
(45) Date of Patent: Dec. 4, 2018

(54) CONFIGURABLE ARCHITECTURE FOR GENERATING A WAVEFORM

(71) Applicants: Lan Hu, Ottawa (CA); Ming Jia, Ottawa (CA); Wen Tong, Ottawa (CA)

(72) Inventors: Lan Hu, Ottawa (CA); Ming Jia, Ottawa (CA); Wen Tong, Ottawa (CA)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 296 days.

(21) Appl. No.: 14/974,919

(22) Filed: Dec. 18, 2015

(65) Prior Publication Data
US 2016/0352543 A1    Dec. 1, 2016

Related U.S. Application Data

(60) Provisional application No. 62/169,302, filed on Jun. 1, 2015.

(51) Int. Cl.
*H04L 25/03* (2006.01)
*H04L 5/00* (2006.01)
(Continued)

(52) U.S. Cl.
CPC ..... *H04L 25/03343* (2013.01); *H04B 1/0092* (2013.01); *H04L 5/0007* (2013.01);
(Continued)

(58) Field of Classification Search
CPC ......... H04L 25/03343; H04L 25/03828; H04L 27/2628; H04L 5/0007; H04L 2025/0342; H04L 2025/03356; H04L 2025/03451; H04L 2025/03605; H04L 2025/03541; H04B 1/0092
See application file for complete search history.

(56) References Cited

U.S. PATENT DOCUMENTS

2002/0168026 A1*  11/2002  Khoini-Poorfard .......................... H04L 27/0012
                                                                    375/303
2010/0034157 A1*  2/2010  Stolyar ............... H04W 72/085
                                                                    370/329
(Continued)

FOREIGN PATENT DOCUMENTS

CN    101252563    8/2008
CN    101355538    1/2009

OTHER PUBLICATIONS

International search report and written opinion; PCT/CN2016/083802; dated Jul. 26, 2016.

*Primary Examiner* — Christine Ng

(57) ABSTRACT

A multi building block architecture may be configured to generate a waveform (a "target wideband signal") for use in a wireless communication system, where the waveform supports a variety of baseband signals. The task of generating a target wideband signal can be divided into several tasks, each task relating to the generating of one of a plurality of sub-carrier bands. Each of the sub-carrier bands (sub-bands) may be generated by one of the sub-band building units included in the sub-band building blocks of the architecture. Several sub-bands may be formed, by a sub-band group building block, into a sub-band group. Multiple sub-band groups may be formed, by a wideband building block, into the target wideband signal.

23 Claims, 20 Drawing Sheets

(51) Int. Cl.
*H04L 27/26* (2006.01)
*H04B 1/00* (2006.01)

(52) U.S. Cl.
CPC .... *H04L 25/03828* (2013.01); *H04L 27/2628* (2013.01); *H04L 2025/0342* (2013.01); *H04L 2025/03356* (2013.01); *H04L 2025/03541* (2013.01); *H04L 2025/03605* (2013.01)

(56) References Cited

U.S. PATENT DOCUMENTS

| | | | | |
|---|---|---|---|---|
| 2010/0169081 A1* | 7/2010 | Yamanashi | ......... | G10L 19/0204 704/203 |
| 2010/0174541 A1* | 7/2010 | Vos | ......... | G10L 19/04 704/230 |
| 2011/0064069 A1* | 3/2011 | Lipka | ......... | H04L 5/0007 370/344 |
| 2012/0182948 A1* | 7/2012 | Huang | ......... | H04L 5/001 370/329 |
| 2012/0269234 A1* | 10/2012 | Zhang | ......... | H04L 5/0007 375/143 |
| 2013/0208838 A1* | 8/2013 | Wu | ......... | H04B 1/1036 375/350 |
| 2014/0286635 A1* | 9/2014 | Kaneko | ......... | H04J 14/0221 398/34 |
| 2014/0347094 A1* | 11/2014 | Hsieh | ......... | H03K 19/017509 326/37 |
| 2015/0124688 A1* | 5/2015 | Xu | ......... | H04B 7/0452 370/312 |
| 2015/0333834 A1* | 11/2015 | Liu | ......... | H04B 10/27 398/66 |
| 2016/0050672 A1* | 2/2016 | Chen | ......... | H04W 72/06 370/329 |
| 2016/0211999 A1* | 7/2016 | Wild | ......... | H04L 27/264 |
| 2017/0317759 A1* | 11/2017 | Agazzi | ......... | H04B 10/516 |

* cited by examiner

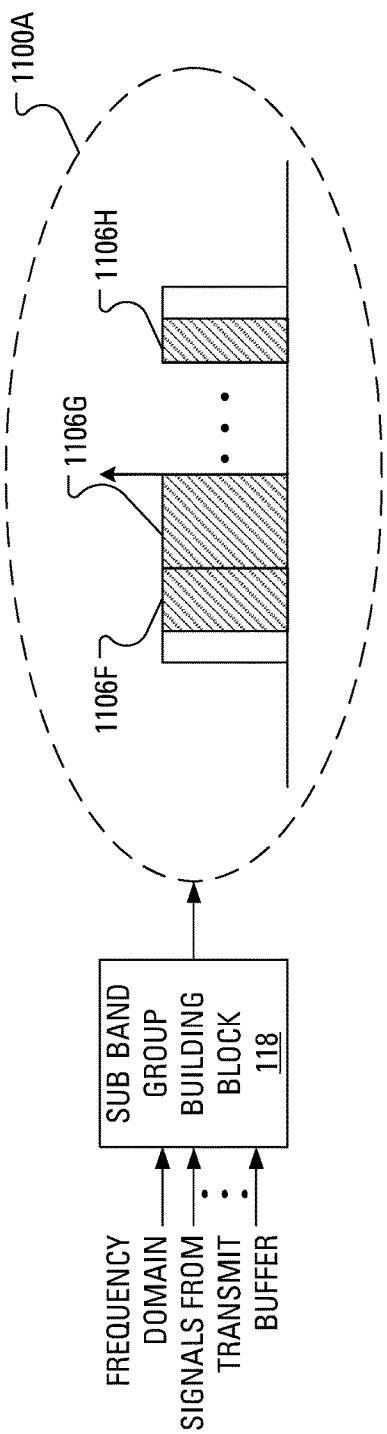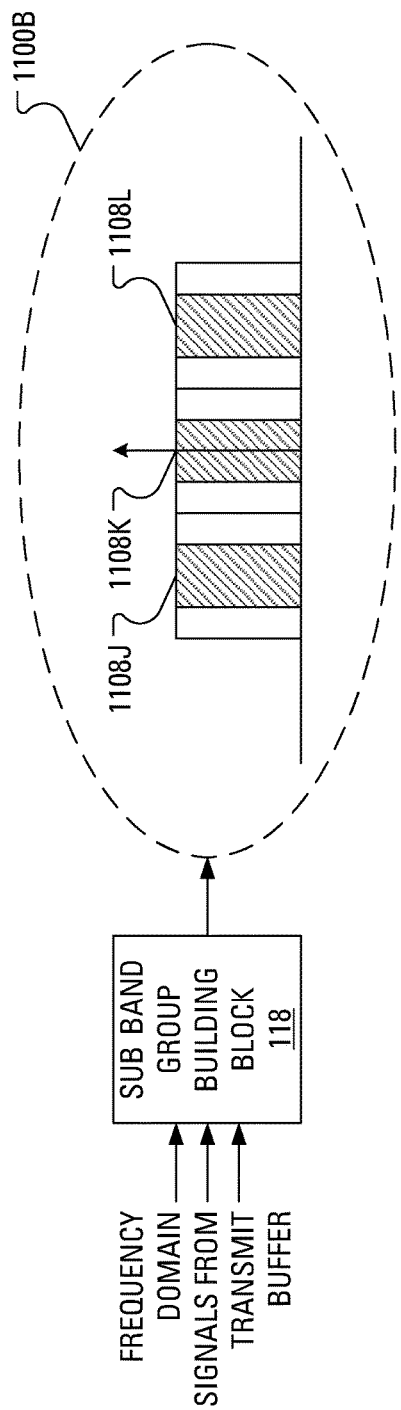
FIG. 11A
FIG. 11B

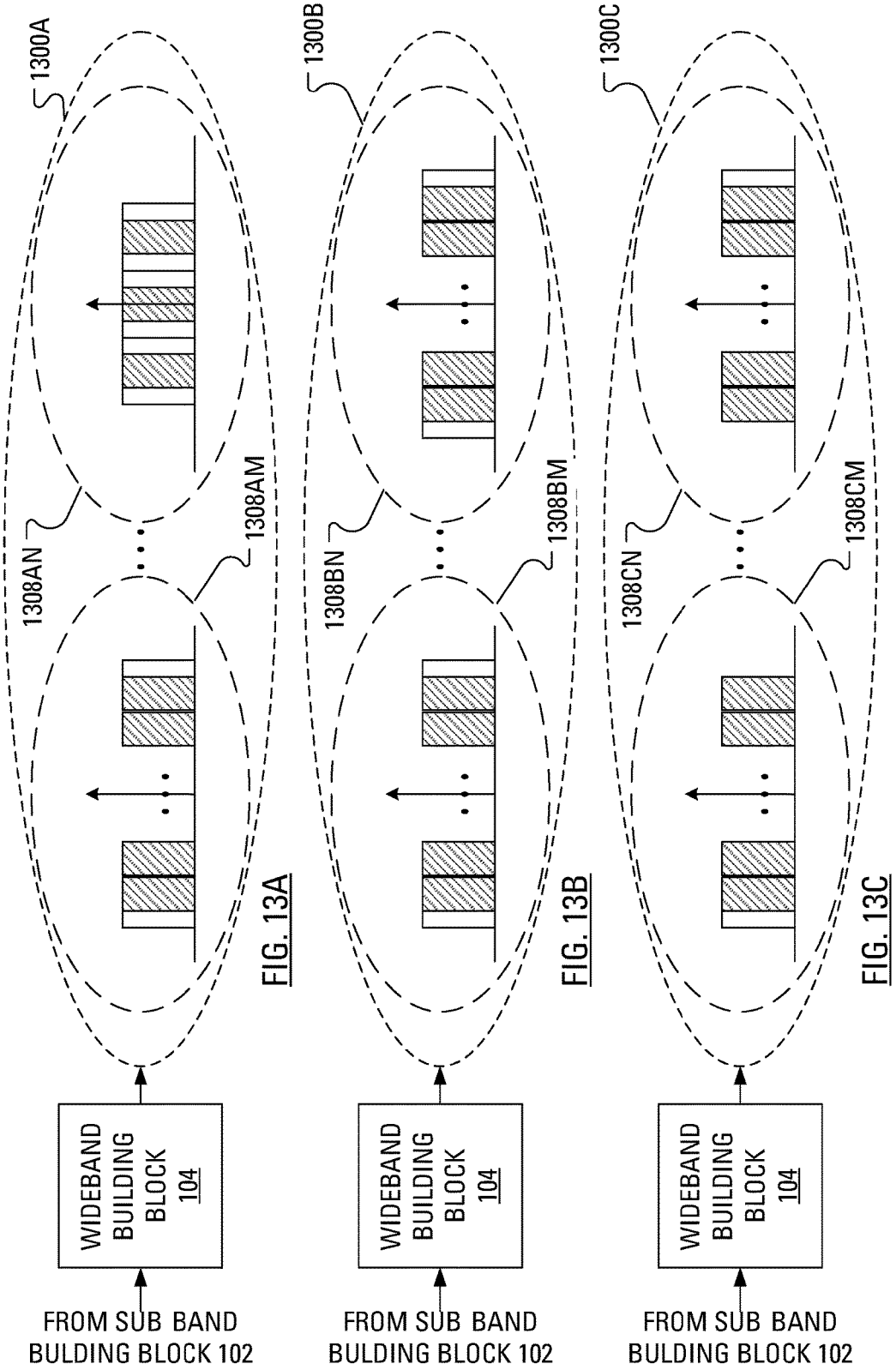

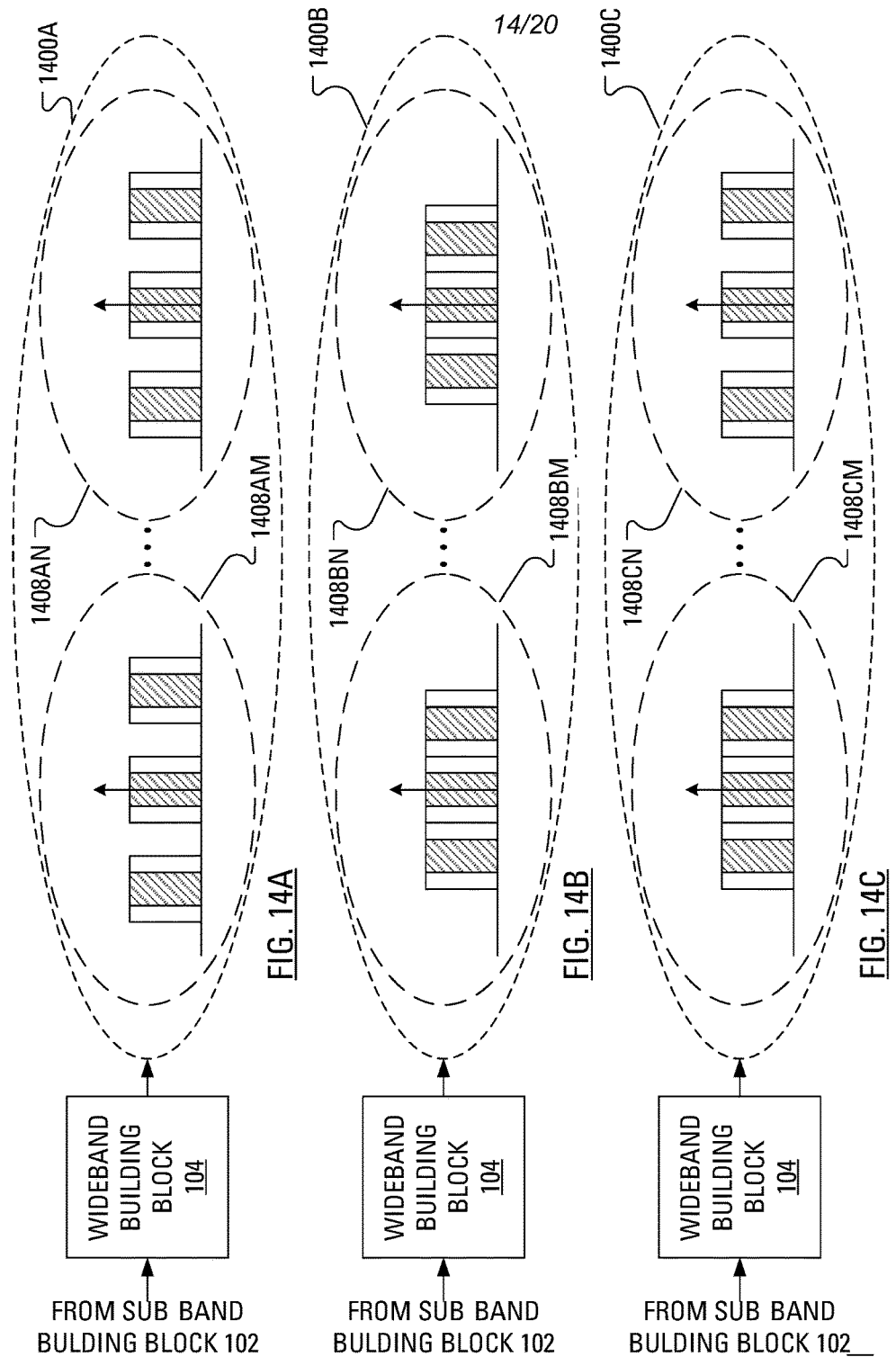

CONFIGURABLE ARCHITECTURE FOR GENERATING A WAVEFORM

FIELD

The present application relates, generally, to generating a waveform for use in a wireless communication system and, more specifically, to a configurable multi-stage and multi-building block architecture for carrying out such generating.

BACKGROUND

Currently, to generate narrowband or wideband waveform for use in a wireless communication system, a single baseband building block is employed.

For Orthogonal Frequency Division Multiplexing (OFDM), information is modulated on very small adjacent carriers within an allocated bandwidth at baseband. OFDM systems are designed to reduce interference among the carriers (also called subcarriers or tones).

In an OFDM system, a stream of data to be transmitted is converted from a serial stream of binary data to a plurality of parallel streams of binary data. Such conversion is usually accomplished within a transmit buffer. The parallel binary data streams may then be quadrature amplitude modulated by mapping sets of bits to complex time domain data symbols. The transformation to the time domain is done with an inverse discrete Fourier Transform (IDFT). The characteristics of complex data symbols include that each symbol describes a two-dimensional vector with a phase and amplitude. A complex data symbol is described with an in-phase and a quadrature component.

OFDM systems interpret the modulated symbols as modulated frequency tones, which are to be transformed to a signal over time in order to be transmitted. Thus, the modulated symbols, having a baseband spectrum, are mapped to orthogonal subcarriers (also called "tones").

To minimize interference between signals transmitted on distinct tones, the signals may be filtered. As is well known in the art, a filter may be described in the frequency domain as having various bands: a pass band; a stop band; and a transition band. The pass band may be designed to have a bandwidth similar to the bandwidth of the signal to be transmitted (signal bandwidth). The stop band is designed to limit transmission of out-of-band signals. The transition band is the range of frequencies between the pass band and the stop band. The transition band may be associated with a transition bandwidth.

SUMMARY

A multi building block architecture may be configured to generate a waveform (a "target wideband signal") for use in a wireless communication system, where the waveform supports a variety of baseband signals. The task of generating a target wideband signal can be divided into several tasks, each task relating to the generating of one of a plurality of sub-carrier bands. Each of the sub-carrier bands (sub-bands) may be generated by one of the sub-band building units included in the sub-band building blocks of the architecture. Several sub-bands may be formed, by a sub-band group building block, into a sub-band group. Multiple sub-band groups may be formed, by a wideband building block, into the target wideband signal.

According to another aspect of the present disclosure, there is provided a configurable multiple building block architecture for generating a target waveform for use in a wireless communication system, the architecture for implementation on one or more processing devices. The architecture includes a plurality of sub-band building blocks, each block of the plurality of sub-band building blocks adapted to form a sub-band group signal such that a plurality of sub-band group signals are formed. Additionally, each block of the plurality of sub-band building blocks is further adapted to receive a plurality of frequency domain signals to be combined into the target waveform, employ a plurality of sub-band building units to build a plurality of sub-bands by receiving a given frequency domain signal among the plurality of frequency domain signals, transforming the frequency domain signal to a time domain signal and filtering the time domain signal. Each block of the plurality of sub-band building blocks is further adapted to employ a sub-band group building block to form the sub-band group signal comprising sub-bands of the filtered time domain signals.

According to another aspect of the present disclosure, there is provided a method of using a configurable multiple building block architecture for forming a plurality of sub-band group signals for use in generating a target waveform for use in a wireless communication system. The method includes at each sub-band building block of a plurality of sub-band building blocks, forming the plurality of sub-band group signals by receiving a plurality of frequency domain signals to be combined into the target waveform. At each sub-band building unit of a plurality of sub-band building units within the sub-band building block, the method includes receiving a given frequency domain signal among the plurality of frequency domain signals, transforming the given frequency domain signal to a given time domain signal and filtering the given time domain signal, thereby building a plurality of sub-bands. At a sub-band group building block within the sub-band building block, the method includes combining the plurality of sub-bands to form a sub-band group signal.

Other aspects and features of the present disclosure will become apparent to those of ordinary skill in the art upon review of the following description of specific implementations of the disclosure in conjunction with the accompanying figures.

BRIEF DESCRIPTION OF THE DRAWINGS

Reference will now be made, by way of example, to the accompanying drawings which show example implementations; and in which:

FIG. 11A diagrammatically illustrates an example output from one of the sub-band group building blocks of FIG. 1;

FIG. 11B diagrammatically illustrates an example output from one of the sub-band group building blocks of FIG. 1;

FIG. 13A diagrammatically illustrates an example output from the wideband building block of FIG. 1;

FIG. 13B diagrammatically illustrates an example output from the wideband building block of FIG. 1;

FIG. 13C diagrammatically illustrates an example output from the wideband building block of FIG. 1;

FIG. 14A diagrammatically illustrates an example output from the wideband building block of FIG. 1;

FIG. 14B diagrammatically illustrates an example output from the wideband building block of FIG. 1;

FIG. 14C diagrammatically illustrates an example output from the wideband building block of FIG. 1;

DETAILED DESCRIPTION

Future wireless systems may require generation of a wideband signal having a bandwidth exceeding 100 MHz and including a variety of signals. Accordingly, it may be considered that there is a need for a new architecture for generating a waveform for use in a wireless communication system.

The Third Generation Partnership Project (3GPP) was responsible for standardizing Long Term Evolution (LTE), fourth generation ("4G") wireless networks. An alliance called the Next Generation Mobile Networks (NGMN) Alliance has defined fifth generation ("5G") network requirements as including: Data rates of several tens of Mb/s should be supported for tens of thousands of users; 1 Gbit/s to be offered, simultaneously, to tens of workers on the same office floor; Several hundreds of thousands of simultaneous connections to be supported for massive sensor deployments; Spectral efficiency should be significantly enhanced compared to 4G; Coverage should be improved; and Signaling efficiency should be enhanced.

In an attempt to address at least some of the 5G network requirements, various candidate sub-carrier waveforms have been suggested for both orthogonal and non-orthogonal 5G multi-carrier communication systems. However, to support these various 5G Candidate waveforms, a novel hardware architecture may be necessary, where the novel hardware architecture is configured to handle various baseband signals. Preferably, some or all of the sub-carrier waveforms are to be compatible with current LTE standard.

One approach to increasing spectrum usage may involve reducing the filter transition band. Such an approach involve configuration at the filter design level. notably, when the ratio of transition bandwidth to signal bandwidth becomes small, the typical single baseband building block architecture requires a relatively long filter length. This requirement for a relatively long filter length increases the complexity of the filter design. Cascade configurations of filters enable relatively long filters. Such configurations will be discussed hereinafter.

Figure 1:
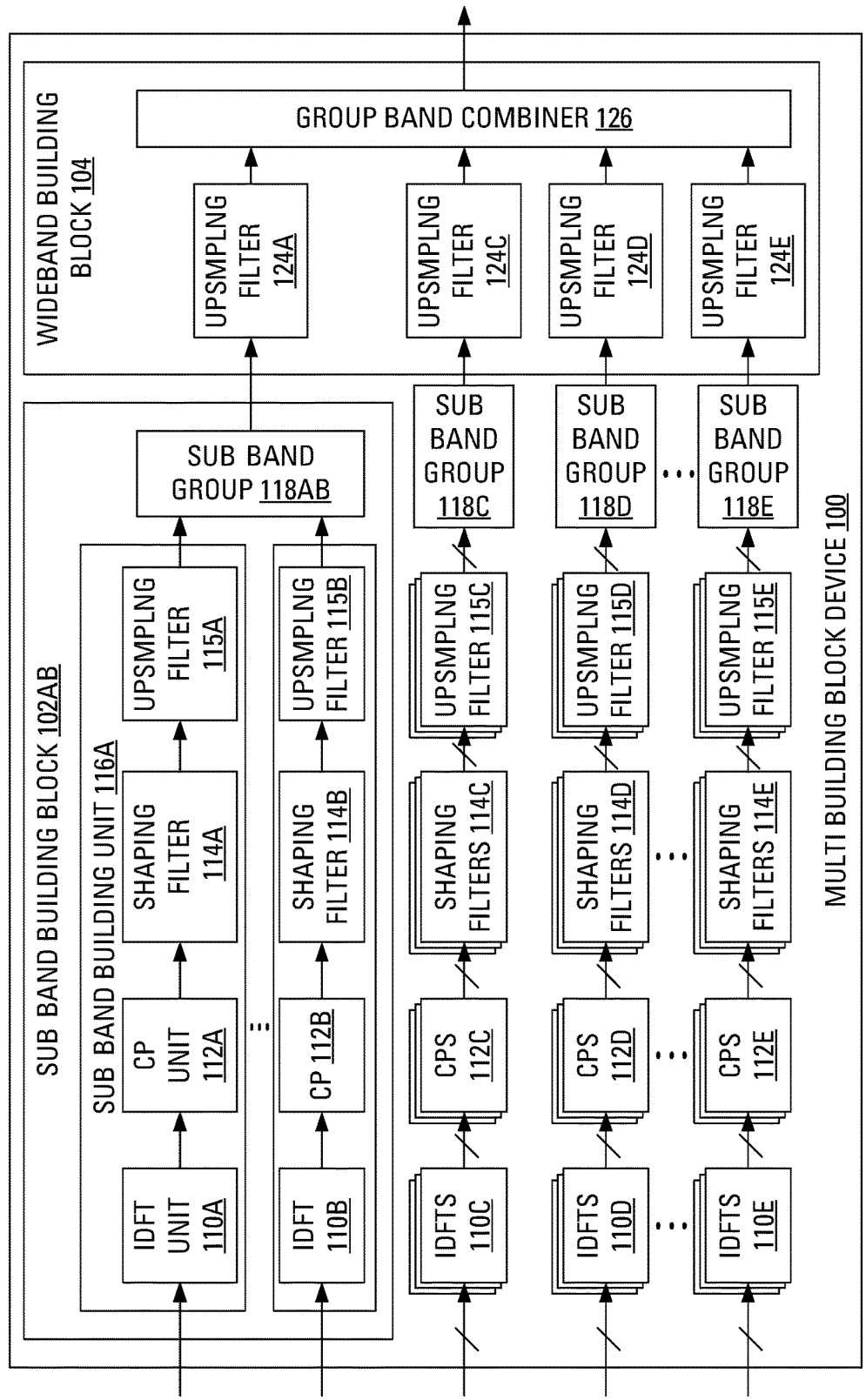
FIG. 1 illustrates a multi building block architecture for generating a target wideband signal, the architecture includes a sub-band building block (including an inverse discrete Fourier transform unit, a shaping filter, a sub-band upsampling filter and a sub-band group building block) and a wideband building block (including wideband upsampling filters and a group band combiner)

FIG. 1 illustrates a multi building block architecture 100 for generating a target wideband signal. The multi building block architecture 100 includes a wideband building block 104 and multiple sub-band building blocks 102, an example first one of which is associated with reference numeral 102AB. The sub-band building block 102AB includes two sub-band building units, an example first one of which is associated with reference numeral 116A, and a first sub-band group building block 118AB. The first sub-band building unit 116A includes a first inverse discrete Fourier transform (IDFT) unit 110A (individually or collectively 110), a first Cyclic Prefix (CP) unit 112A, a first shaping filter 114A and a first sub-band upsampling filter 115A. A second sub-band building unit includes a second IDFT unit 110B, a second CP unit 112B, a second shaping filter 114B and a second sub-band upsampling filter 115B, though the second sub-band building unit is not explicitly labeled as such.

Also not explicitly labeled as such, a third sub-band building unit includes a plurality of IDFT units 110C, a plurality of CP units 112C, a plurality of shaping filters 114B and a plurality of sub-band upsampling filters 115C. Similarly, a fourth sub-band building unit includes a plurality of IDFT units 110D, a plurality of CP units 112D, a plurality of shaping filters 114D and a plurality of sub-band upsampling filters 115D. Furthermore, a fifth sub-band building unit includes a plurality of IDFT units 110E, a plurality of CP units 112E, a plurality of shaping filters 114E and a plurality of sub-band upsampling filters 115E.

The third sub-band building unit is associated with a second sub-band group building block 118C. The fourth sub-band building unit is associated with a third sub-band group building block 118D. The fifth sub-band building unit is associated with a fourth sub-band group building block 118E.

The wideband building block 104 includes a first wideband upsampling filter 124A, a second wideband upsampling filter 124C, a third wideband upsampling filter 124D and a fourth wideband upsampling filter 124E. The wideband building block 104 also includes a group band combiner 126.

As should be clear to a person of ordinary skill in the art, the blocks of the block diagram of FIG. 1 are representative of functions, rather than being representative of specific hardware. Indeed, all of the functions illustrated in FIG. 1 may be carried out by a single microprocessor or, more generically, a processor. Alternatively, the functions illustrated in FIG. 1 may be carried out by a plurality of processors, with specific processors employed to carry out specific functions. Such arrangements are well known in the art and specific arrangements are, therefore, not provided herein. Further alternatively, the functions illustrated in FIG. 1 may be carried out by a single block Application Specific Integrated Circuit (ASIC) resource or a Field Programmable Gate Array (FPGA) resource, with a timing of the use of the resource shared by the various blocks. A single processor, a collection of processors, an ASIC or an FPGA may each be called a "processing device."

Figure 2:
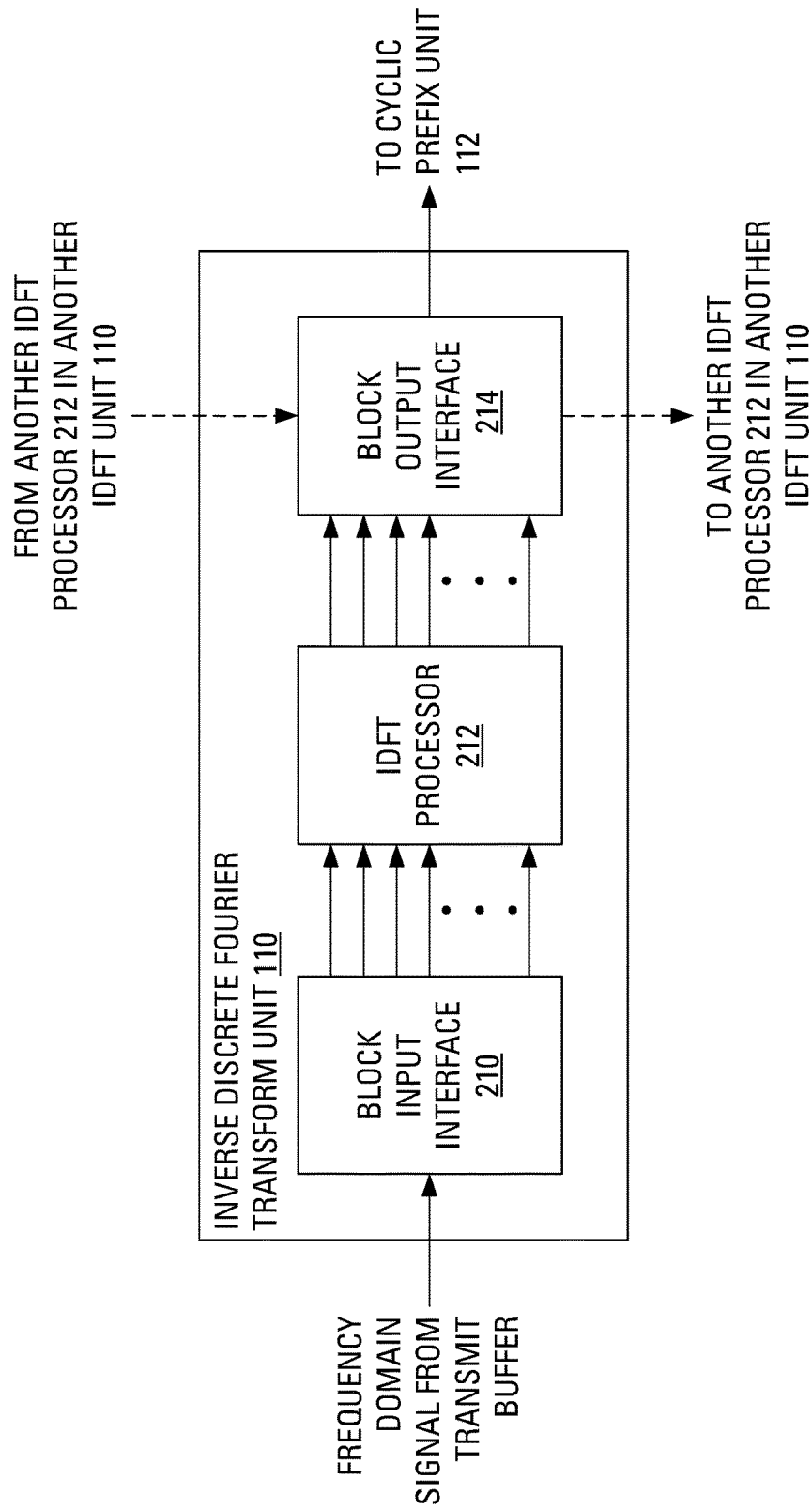
FIG. 2 schematically illustrates example components of one of the inverse discrete Fourier transform units of FIG. 1.

FIG. 2 schematically illustrates example components of one of the IDFT units 110. The example IDFT unit 110 includes a block input interface 210 connected to a IDFT processor 212 connected to a block output interface 214. Notably, optional connections between IDFT units 110 allow the IDFT units 110 to be cascaded to handle IDFT processes that may be beyond the capabilities of a single IDFT processor 212. Notably, an indeterminate number of ports connect the block input interface 210 to the IDFT processor 212 and an indeterminate number of ports connect the IDFT processor 212 connected to the block output interface 214. Such a configuration allows for several IDFT processors 212 to be configured together to form a larger-size IDFT processor 212, if required.

Figure 3:
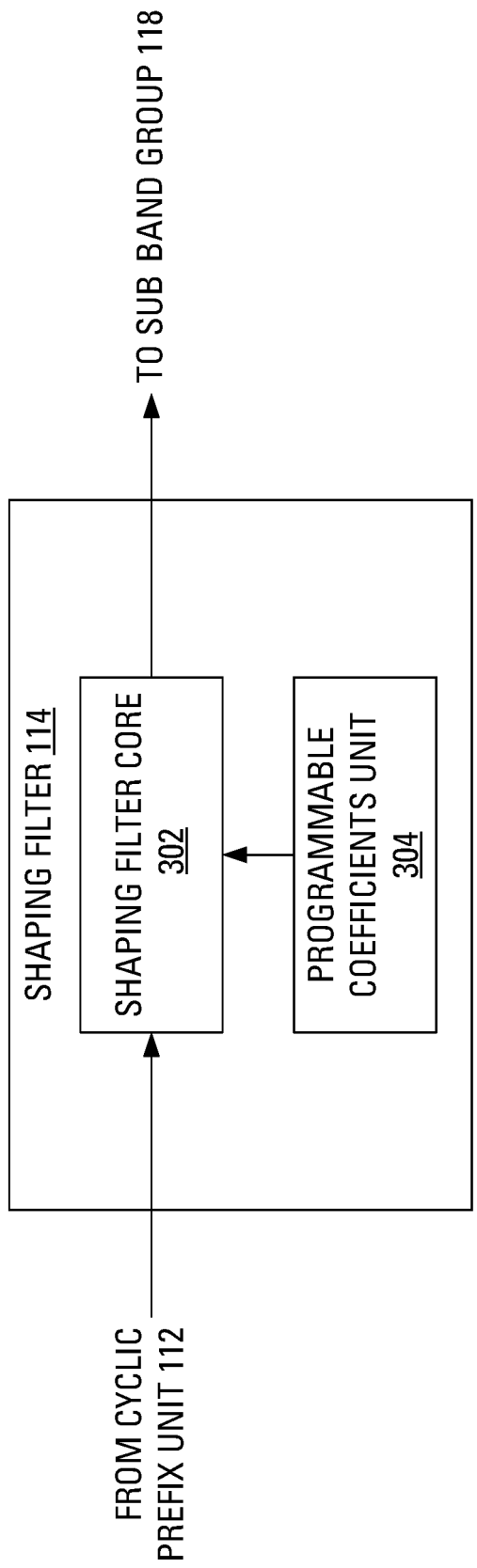
FIG. 3 schematically illustrates example components, including a shaping filter core, of one of the shaping filters of FIG. 1.

FIG. 3 schematically illustrates example components of one of the shaping filters 114. The shaping filter 114 includes a shaping filter core 302 arranged to receive input from a programmable coefficients unit 304.

Figure 4:
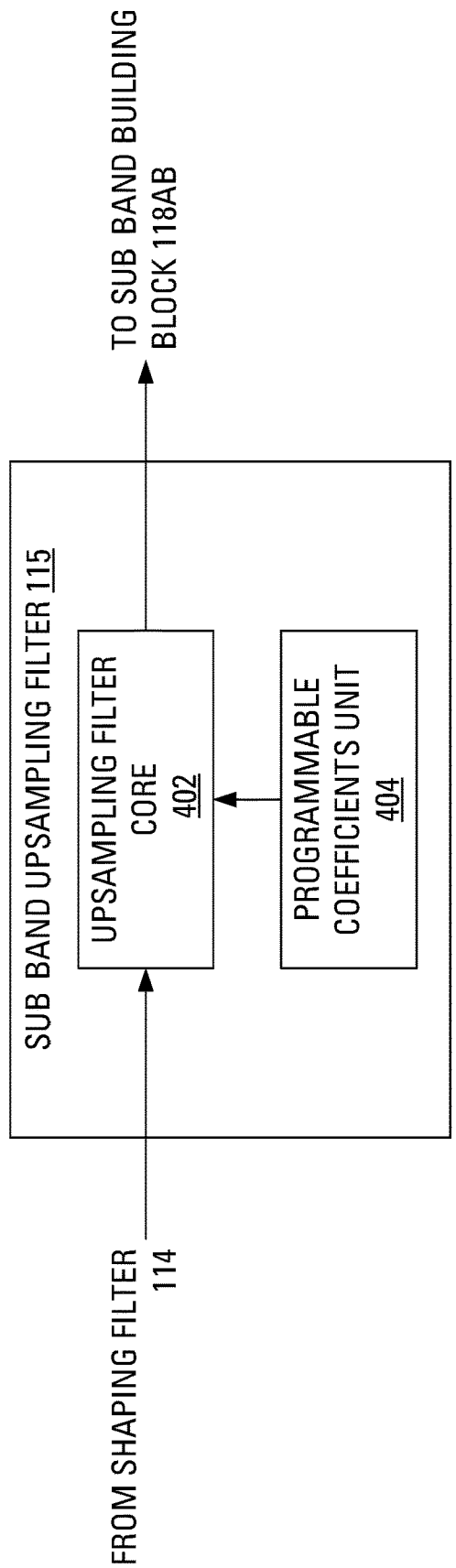
FIG. 4 schematically illustrates example components, including a sub-band upsampling filter core, of one of the sub-band upsampling filters of FIG. 1.

FIG. 4 schematically illustrates example components of one of the sub-band upsampling filters 115. As illustrated, the sub-band upsampling filters 115 includes a sub-band upsampling filter core 402 arranged to receive input from a programmable coefficients unit 404. Example filters suitable for use as the sub-band upsampling filter core 402 include interpolation filters and rate change filters.

Figure 5:
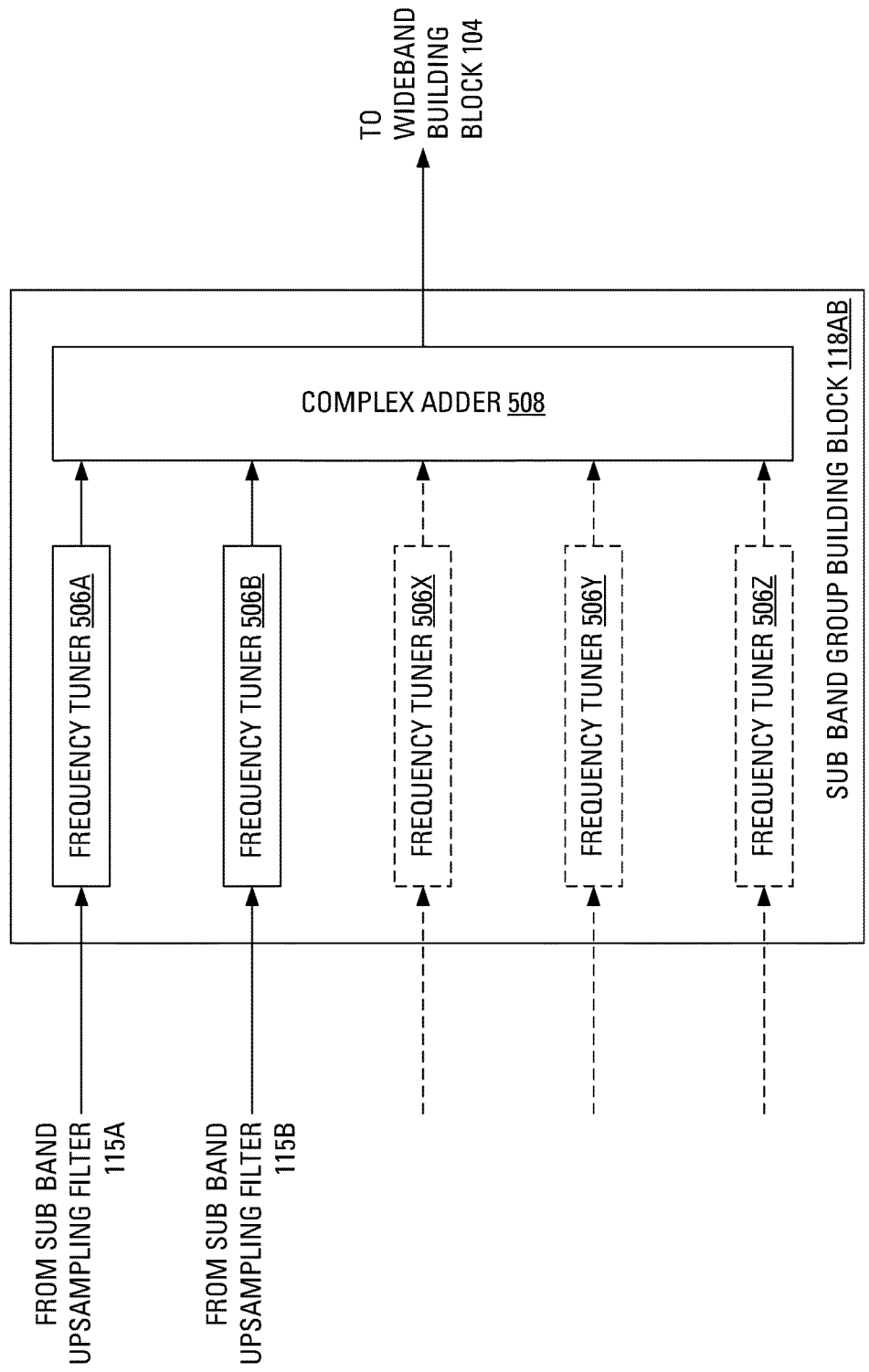
FIG. 5 schematically illustrates example components, including frequency tuners and a complex adder, of one of the sub-band group building blocks of FIG. 1.

FIG. 5 schematically illustrates example components of the first sub-band group building block 118AB of FIG. 1. The first sub-band group building block 118AB includes a first frequency tuner 506A arranged to receive input from the first sub-band upsampling filter 115A and pass output to a complex adder 508. The first sub-band group building block 118AB also includes a second frequency tuner 506B arranged to receive input from the second sub-band upsampling filter 115B and pass output to the complex adder 508.

Since, as illustrated in FIG. 1, the first sub-band group building block 118AB only receives two inputs, only the first frequency tuner 506A and the second frequency tuner 506B are employed. However, for the sake of generality, the first sub-band group building block 118AB is illustrated as having: a third frequency tuner 506C arranged to receive input from a non-illustrated sub-band upsampling filter and pass output to the complex adder 508; a fourth frequency tuner 506D arranged to receive input from a non-illustrated sub-band upsampling filter and pass output to the complex adder 508; and a fifth frequency tuner 506E arranged to receive input from a non-illustrated sub-band upsampling filter and pass output to the complex adder 508.

FIG. 1 illustrates shaping filters 114 and sub-band upsampling filters 115. In an alternative embodiment, these two functions may be handled in a single, amalgamated filter.

Figure 6:
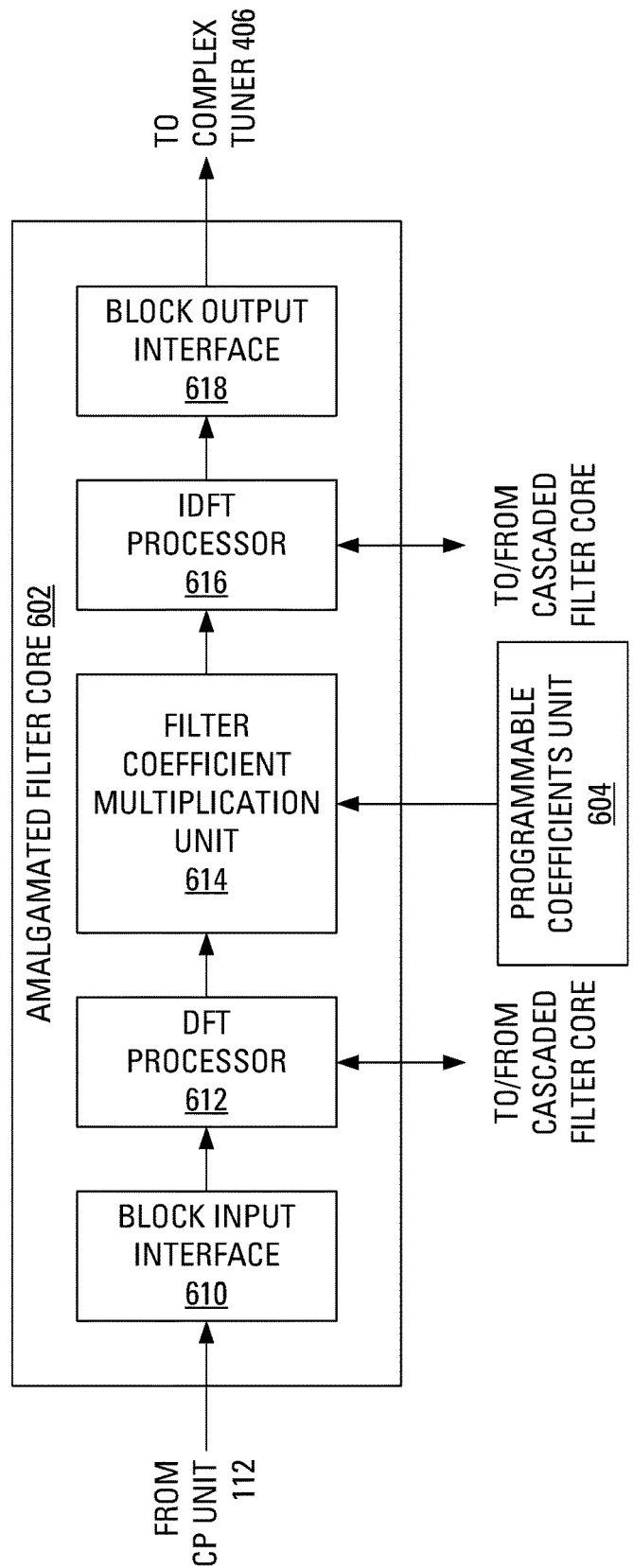
FIG. 6 schematically illustrates example components of an amalgamated filter core, combining functions of the shaping filter core of FIG. 3 and the sub-band upsampling filter core of FIG. 5.

FIG. 6 schematically illustrates example components of an amalgamated filter core 602, combining functions of the shaping filter core 302 of FIG. 3 and the sub-band upsampling filter core 402 of FIG. 4. The amalgamated filter core 602 includes a block input interface 610 in communication with a DFT processor 612, which is in communication with a filter coefficient multiplication unit 614. The filter coefficient multiplication unit 614 is in communication with an IDFT processor 616, which is, in turn, in communication with a block output interface 618.

Figure 7:
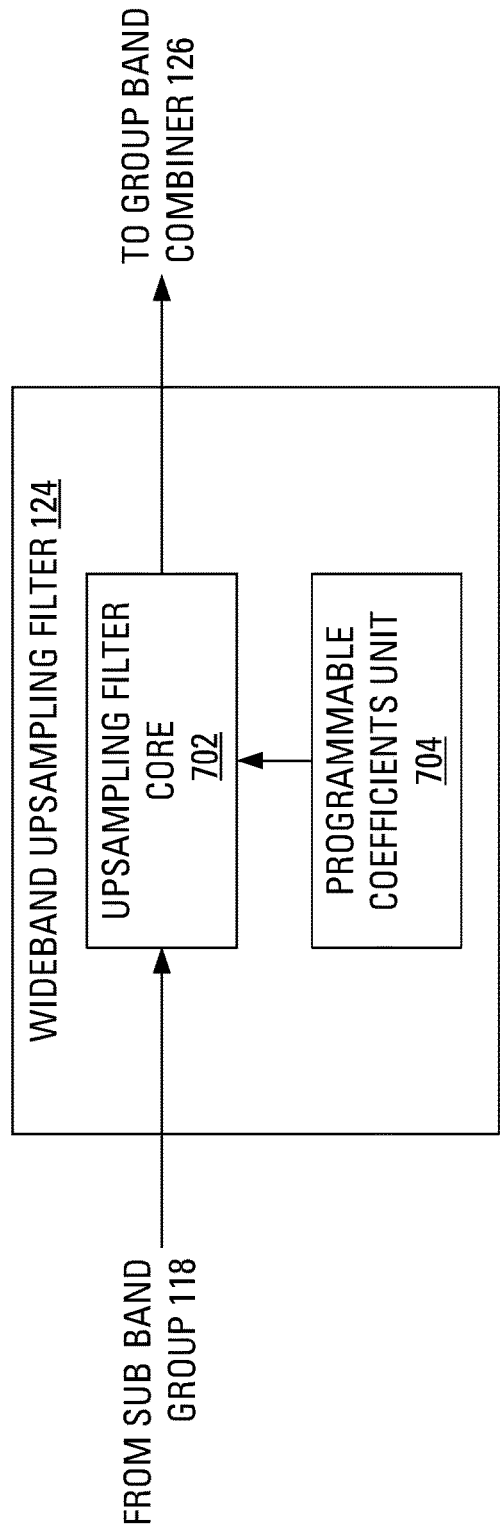
FIG. 7 schematically illustrates example components, including an upsampling filter core, of one of the upsampling filters of FIG. 1.

FIG. 7 schematically illustrates example components of one of the wideband upsampling filters 124. The example wideband upsampling filter 124 includes an upsampling filter core 702 arranged to receive input from a programmable coefficients unit 704. The upsampling filter core 702 may be configured as an interpolate filter. Alternatively, the upsampling filter core 702 may be configured as a rate changing filter.

Figure 8:
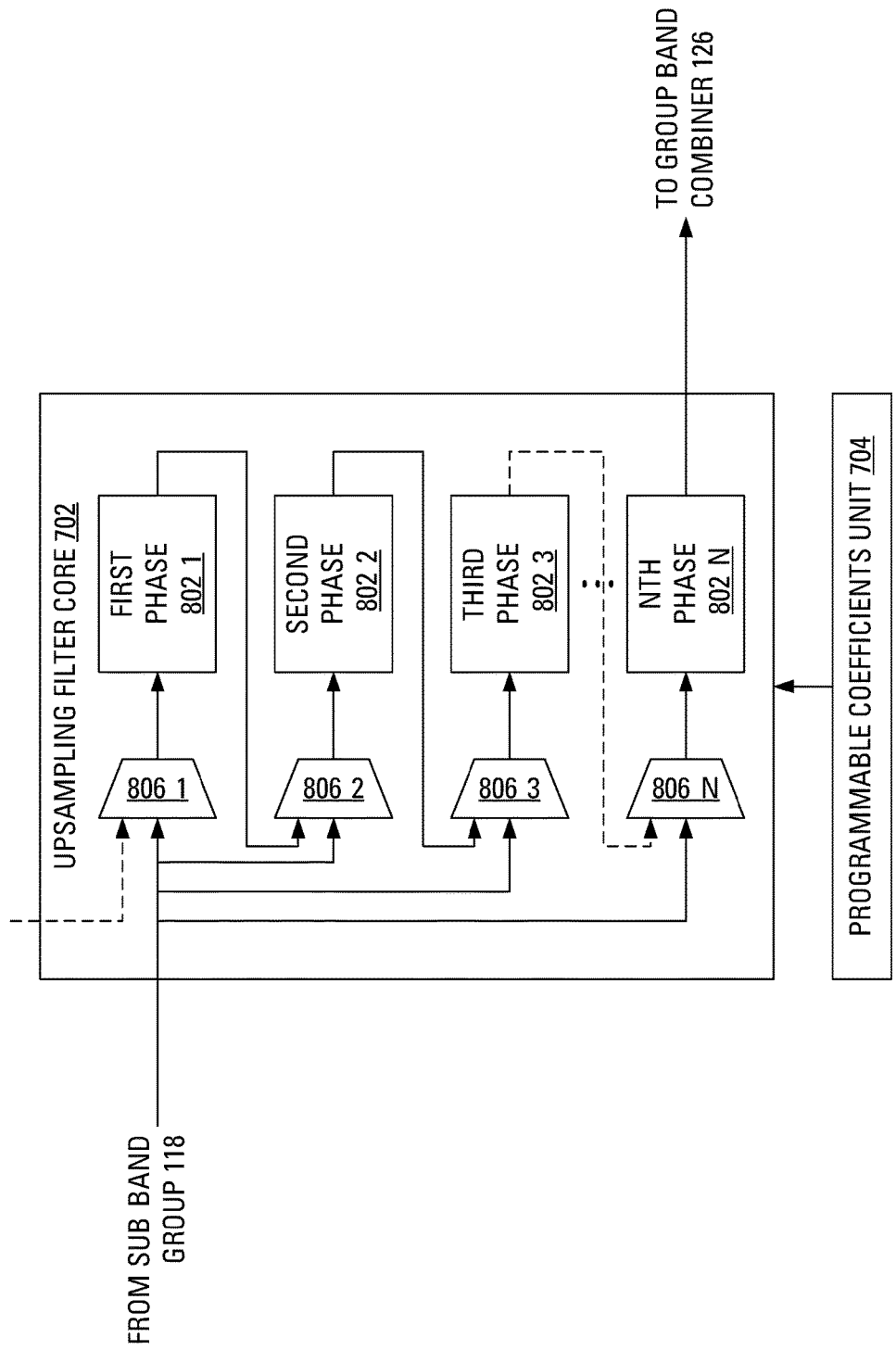
FIG. 8 schematically illustrates example components of the upsampling filter core of FIG. 7.

FIG. 8 schematically illustrates example components of the upsampling filter core 702 of FIG. 7. The upsampling filter core 702 includes N phases: a first phase 802-1; a second phase 802-2; a third phase 802-3; through to an Nth phase 802-N. Input to the upsampling filter core 702 is received by a first multiplexer 806-1 and passed to the first phase 802-1.

In a first cascade mode, the output of the first phase 802-1 is received at a second multiplexer 806-2 along with the input to the upsampling filter core 702. The output of the second multiplexer 806-2 is passed to the second phase 802-2. The output of the second phase 802-2 is received at a third multiplexer 806-3 along with the input to the upsampling filter core 702. The output of the third multiplexer 806-3 is passed to the third phase 802-3. The output of the N−1th phase (not shown) is received at an Nth multiplexer 806-N along with the input to the upsampling filter core 702. The output of the Nth multiplexer 806-N is passed to the Nth phase 802-N.

A second cascade mode is similar to the first cascade mode. A difference between the modes is notable in that, in the second cascade mode, the first multiplexer 806-1 receives output from another upsampling filter core.

Figure 9:
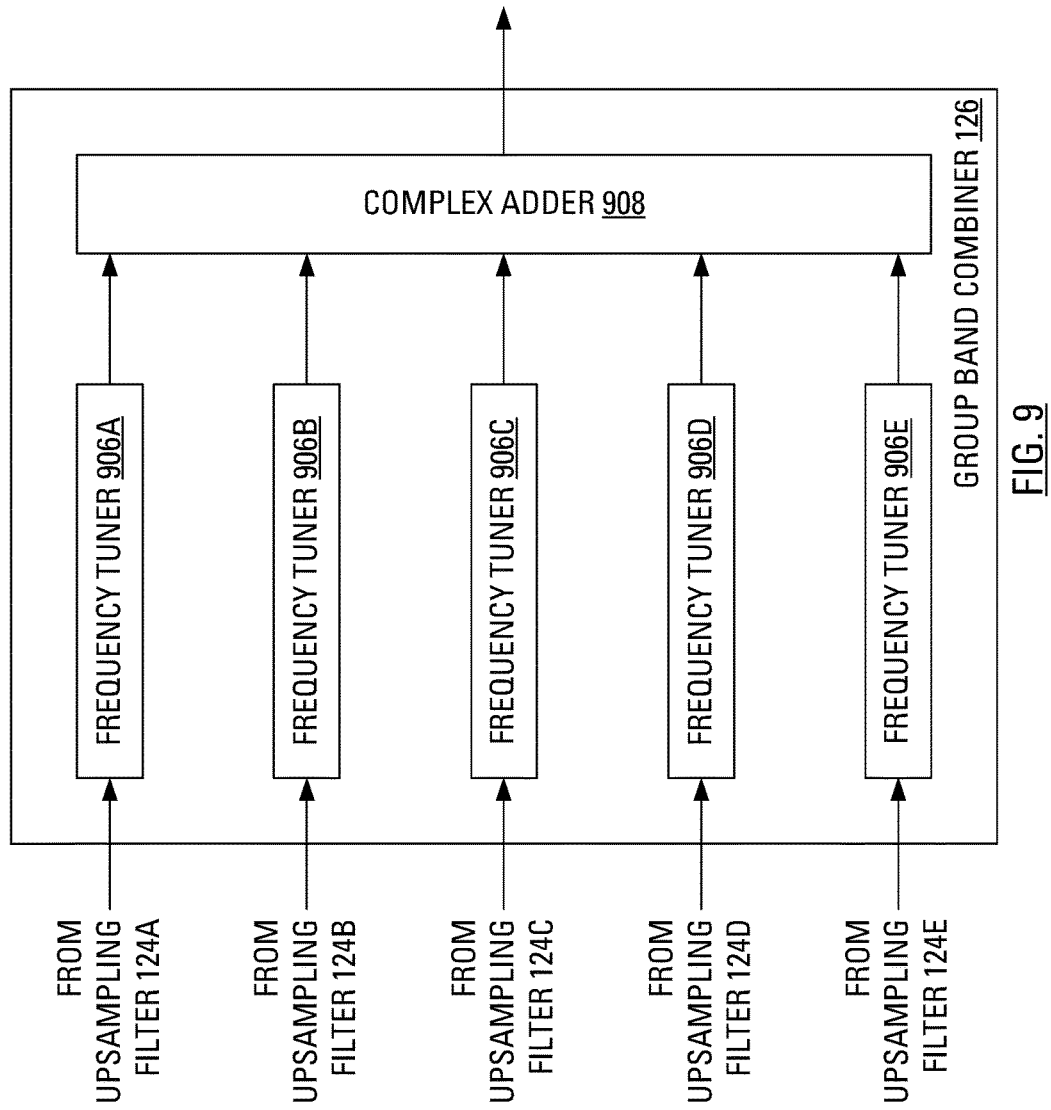
FIG. 9 schematically illustrates example components of the group band combiner of FIG. 1.

FIG. 9 schematically illustrates example components of the group band combiner 126 of FIG. 1. The group band combiner 126 includes: a first frequency tuner 906A; a second frequency tuner 906B; a third frequency tuner 906C; a fourth frequency tuner 906D; and a fifth frequency tuner 906E (collectively or individually, 906). Each of the frequency tuners 906 is arranged to pass output to a complex adder 908. In operation, each frequency tuner 906 receives input from a respective wideband upsampling filter 124 (see FIG. 1) and passes its output to the complex adder 908.

In overview, the configurable multi building block architecture 100 of FIG. 1 is designed to be operable generate a waveform (a "target wideband signal") for use in a wireless communication system, where the waveform supports a variety of baseband signals. The task of generating a target wideband signal can be divided into several tasks, each task relating to the generating of one of a plurality of sub-carrier bands. Each of the sub-carrier bands (sub-bands) may be generated by one of the sub-band building units 116 included in the sub-band building blocks 102 of FIG. 1. Several sub-bands may be formed, by the sub-band group building block 118, into a sub-band group. Multiple sub-band groups may be formed, by the wideband building block 104, into the target wideband signal.

The configurable multi building block architecture 100 of FIG. 1 may be seen to enable flexible OFDM parameter configuration among carriers. The various parameters that may be configured include: the number of subcarriers; the sub-carrier space; and the number of guard tones. The configuration of such parameters may be accomplished by appropriately configuring individual ones of the sub-band group building blocks 118. More particularly, the configuration of such parameters may be accomplished by appropriately configuring individual ones of the programmable coefficients units 404.

Conveniently, when multiple sub-band building units 116 are used, as illustrated in FIG. 1, in the process of generating a wideband signal, at the output of 104, each sub-band building unit 116 may operate at a clock rate that is lower than the clock rate used for the wideband signal. The multiple sub-band building units 116 may, in some instances, share the same resource (i.e., a single processor, not shown). Indeed, each of the multiple IDFTs 110 may operate with a Fast Fourier Transform (FFT) size that is relatively small in comparison to an FFT size that would be used in a single block approach. This enables the assignment of different sets of OFDM parameters for sub-bands within the wideband signal. The different sets of OFDM parameters are sometimes referred to as different numerologies.

In operation, the architecture 100 the plurality of sub-band building blocks 102 handle generation of individual sub-bands, often with distinct filtering characteristics, and grouping of the sub-bands. The groups of sub-bands are combined, in the wideband building block 104, for form the target wideband signal.

Figure 10:
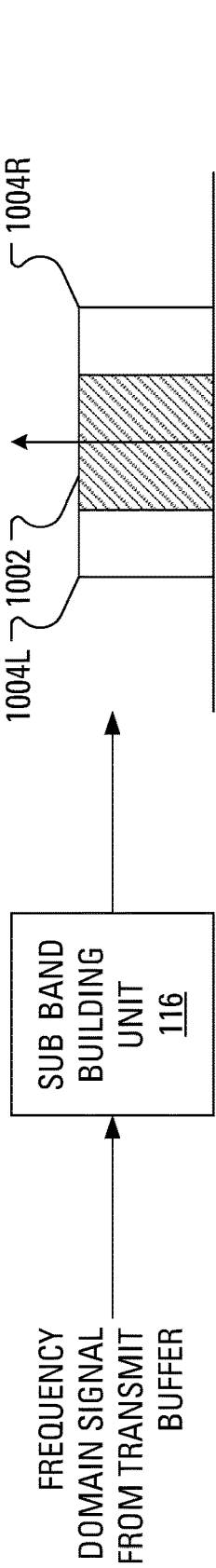
FIG. 10 diagrammatically illustrates an example output from one of the sub-band building units of FIG. 1.

Specifically, the sub-band building unit 116 generates a sub-band. FIG. 10 diagrammatically illustrates an example output from one of the sub-band building units 116 of FIG. 1. The output, a sub-band 1000, is illustrated in the frequency domain as including an information-carrying band 1002 and two guard bands 1004L, 1004R.

In operation, the sub-band group building block 118 forms a sub-band group comprising several sub-bands. FIG. 11A diagrammatically illustrates an example output from one of the sub-band group building blocks 118 of FIG. 1. The output, a sub-band group 1100A, is illustrated in the frequency domain as including three of many sub-bands: a first sub-band 1106F with a first bandwidth; a second sub-band 1106G with a second bandwidth; and a third sub-band 1106H with a third bandwidth (collectively or individually, the sub-bands may be referenced by numeral 1106). Notably, the information-carrying bands of the sub-bands 1106 are adjacent. Furthermore, the second sub-band 1106G (and other sub-bands that are not shown) does not have guard bands and the first sub-band 1106F and the third sub-band 1106H only have a guard band on the side that is not adjacent to the second sub-band 1106G. Although three sub-bands are illustrated, it should be understood that these three sub-bands are only used as an example and the quantity of sub-bands may be greater or fewer. Furthermore, in subsequent figures, sub-bands are generically illustrated with similar bandwidths. However, it should be understood that the individual sub-bands may each be configured distinctly, with distinct bandwidths.

FIG. 11B diagrammatically illustrates an example output from one of the sub-band group building blocks 118 of FIG. 1. The output, a sub-band group 1100B, is illustrated in the frequency domain as including three sub-bands: a first sub-band 1108J; a second sub-band 1108K; and a third sub-band 1108L (collectively or individually referenced by numeral 1108). Although three sub-bands 1108 are illustrated, it should be understood that these three sub-bands 1108 are only used as an example and the quantity of sub-bands may be greater or fewer. As illustrated in FIG. 11B, each of these three sub-bands 1108 have a guard band on both sides and the guard bands of the sub-bands 1108 are adjacent.

Figure 12A:
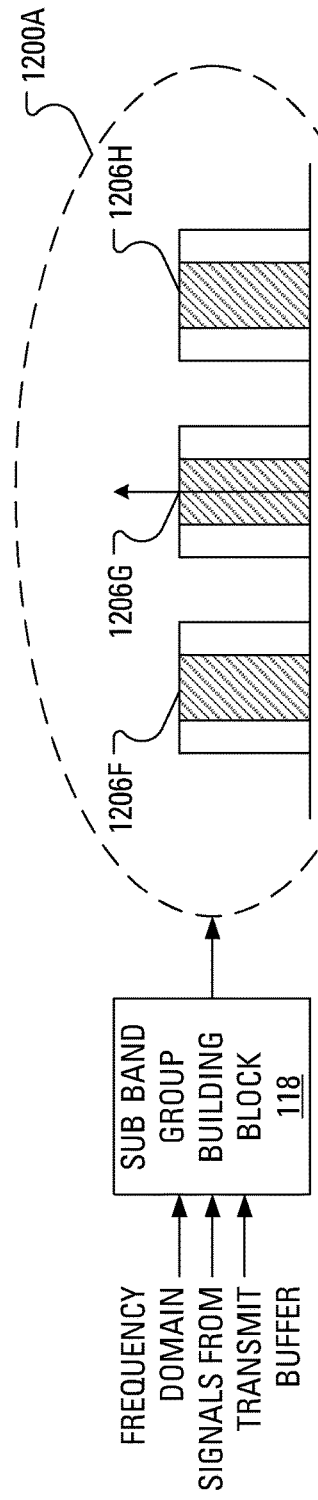
FIG. 12A diagrammatically illustrates an example output from one of the sub-band group building blocks of FIG. 1.

FIG. 12A diagrammatically illustrates an example output from one of the sub-band group building blocks 118 of FIG. 1. The output, a sub-band group 1200A, is illustrated in the frequency domain as including three sub-bands: a first sub-band 1206F; a second sub-band 1206G; and a third sub-band 1206H (collectively or individually referenced by numeral 1206). Although three sub-bands 1206 are illustrated, it should be understood that these three sub-bands 1206 are only used as an example and the quantity of sub-bands may be greater or fewer. As illustrated in FIG. 12A, the guard bands of the sub-bands are separated by an extended guard band, illustrated as blank space between the guard bands.

Figure 12B:
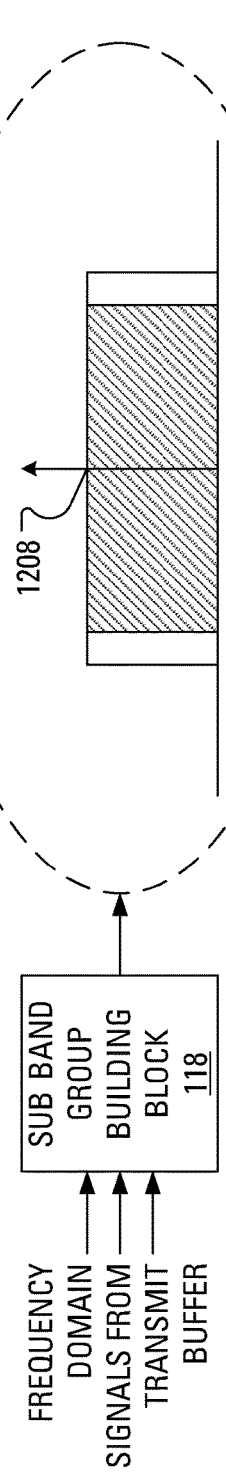
FIG. 12B diagrammatically illustrates an example output from one of the sub-band group building blocks of FIG. 1.

FIG. 12B diagrammatically illustrates an example output from one of the sub-band group building blocks 118 of FIG. 1. The output, a sub-band group 1200B, is illustrated in the frequency domain as including a single sub-band 1208.

Conveniently, the architecture 100 disclosed herein enables generation of a target wideband signal comprising several lower bandwidth signals using one or several sub-band group building blocks 118 to enable processor resource sharing or hardware sharing, thereby significantly reducing usage of processor resources or hardware resources.

Configuring the sub-band group building block 118 to output a sub-band group may, for example, involve configuring the sub-band upsampling filters 115 (see FIG. 4) with specific coefficients in the programmable coefficients units 404.

Notably, there may, occasionally, be reasons to configure the architecture 100 such that the sub-band group building block 118 is bypassed. Bypassing the sub-band group building block 118 may be accomplished by setting a tuning frequency, in frequency tuners 406, to be zero and setting filter coefficients, in the programmable coefficients units 404, to "1" or "0."

In operation, the wideband building block 104 forms the target wideband signal comprising several sub-band groups.

FIG. 13A diagrammatically illustrates an example output from the wideband building block 104 of FIG. 1. The output, a first target wideband signal 1300A, is illustrated in the frequency domain as including multiple sub-band groups: a first sub-band group 1308AM; and a second sub-band group 1308AN. Although two sub-band groups 1308A are illustrated, it should be understood that these two sub-band groups 1308A are only used as an example and that the quantity of sub-band groups 1308A may be greater or fewer than two. As illustrated in FIG. 13A, for the first sub-band group 1308AM, most of the information-carrying bands are adjacent, with only the outermost information-carrying bands having guard bands. As illustrated in FIG. 13A, each of the information-carrying bands in the second sub-band group 1308AN is bracketed by guard bands and the guard bands of the sub-bands in the second sub-band group 1308AN are adjacent. That is, the first target wideband signal 1200A 1300A includes a mix of types of sub-band groups 1308A. Though not specifically illustrated, it is notable that, in one embodiment, the first target wideband signal 1300A may include guard bands between the sub-band groups 1308A and, in another embodiment, the first target wideband signal 1300A may comprise adjacent sub-band groups 1308A.

FIG. 13B diagrammatically illustrates an example output from the wideband building block 104 of FIG. 1. The output, a second target wideband signal 1300B, is illustrated in the frequency domain as including multiple sub-band groups: a first sub-band group 1308BM; and a second sub-band group 1308BN. Although two sub-band groups 1308B are illustrated, it should be understood that these two sub-band groups 1308B are only used as an example and that the quantity of sub-band groups 1308B may be greater or fewer. As illustrated in FIG. 13B, for the first sub-band group 1308BM and for the second sub-band group 1308BN, most of the information-carrying bands are adjacent, with only the outermost information-carrying bands having guard bands. That is, the second target wideband signal 1300B includes a consistent type of sub-band group 1308B. Though not specifically illustrated, it is notable that, in one embodiment, the second target wideband signal 1300B may include guard bands between the sub-band groups 1308B and, in another embodiment, the second target wideband signal 1300B may comprise adjacent sub-band groups 1308B.

FIG. 13C diagrammatically illustrates an example output from the wideband building block 104 of FIG. 1. The output, a third target wideband signal 1300C, is illustrated in the frequency domain as including multiple sub-band groups: a first sub-band group 1308CM; and a second sub-band group 1308CN. Although two sub-band groups 1308C are illustrated, it should be understood that these two sub-band groups 1308C are only used as an example and that the quantity of sub-band groups 1308C may be greater or fewer. As illustrated in FIG. 13C, for the first sub-band group 1308CM, most of the information-carrying bands are adjacent, with only the leftmost information-carrying band having a guard band. For the second sub-band group 1308CN, most of the information-carrying bands are adjacent, with only the rightmost information-carrying band having a guard band. That is, the third target wideband signal 1300C includes a mix of types of sub-band groups 1308C that may be combined, by group band combiner 126, into a single wideband information-carrying signal bracket by guard bands.

FIG. 14A diagrammatically illustrates an example output from the wideband building block 104 of FIG. 1. The output, a fourth target wideband signal 1400A, is illustrated in the frequency domain as including multiple sub-band groups: a first sub-band group 1408AM; and a second sub-band group 1408AN. Although two sub-band groups 1408A are illustrated, it should be understood that these two sub-band groups 1408A are only used as an example and that the quantity of sub-band groups 1408A may be greater or fewer. As illustrated in FIG. 14A, the guard bands of the sub-bands in the first sub-band group 1408AM and the second sub-band group 1408AN are separated by extended guard bands. That is, the fourth target wideband signal 1400A includes a consistent type of sub-band group 1408A.

FIG. 14B diagrammatically illustrates an example output from the wideband building block 104 of FIG. 1. The output, a second target wideband signal 1400B, is illustrated in the frequency domain as including multiple sub-band groups: a first sub-band group 1408BM; and a second sub-band group 1408BN. Although two sub-band groups 1408B are illustrated, it should be understood that these two sub-band groups 1408B are only used as an example and that the quantity of sub-band groups 1408B may be greater or fewer. As illustrated in FIG. 14B, the guard bands of the sub-bands in the first sub-band group 1408BM and the second sub-band group 1408BN are adjacent. That is, the second target wideband signal 1400B includes a consistent type of sub-band group 1408B. Though not specifically illustrated, it is notable that, in one embodiment, the fifth target wideband signal 1400B may include guard bands between the sub-band groups 1408B and, in another embodiment, the fifth target wideband signal 1400B may comprise adjacent sub-band groups 1408B.

FIG. 14C diagrammatically illustrates an example output from the wideband building block 104 of FIG. 1. The output, a sixth target wideband signal 1400C, is illustrated in the frequency domain as including multiple sub-band groups: a first sub-band group 1408CM; and a second sub-band group 1408CN. Although two sub-band groups 1408C are illustrated, it should be understood that these two sub-band groups 1408C are only used as an example and that the quantity of sub-band groups 1408C may be greater or fewer. As illustrated in FIG. 14C, the guard bands of the sub-bands in the first sub-band group 1408CM are adjacent and the guard bands of the sub-bands in the second sub-band group 1408CN are separated by extended guard bands. That is, the sixth target wideband signal 1400C includes a mix of types of sub-band groups 1408C.

Depending on the requirement, one or more of the sub-band building units 116, one or more of the sub-band building blocks 102 or the wideband building block 104 may be shut down.

For a first example, consider that the target wideband signal that is to be generated includes two signals. The two signals have the same bandwidth (say, 20 MHz) but a different number of guard tones. In such a case, due to a different number of guard tones, distinct shaping filters are required for the two signals. Rather than use a single shaping filter designed in an attempt to address the requirements of both signals, the multi building block architecture 100 of FIG. 1 may be arranged such that the two signals are handled by two distinct sub-band building blocks 102 and that the sub-band building blocks 102 are configured in a manner specific to the requirements of each of the two signals. The filtering of the two 20 MHz signals can be "timing shared" by using a single physical sub-band building block 102 and two different sets of shaping filter coefficients.

For a second example, again consider that the target wideband signal that is to be generated includes two signals. The two signals have the same bandwidth (say, 20 MHz) but distinct sub-carrier space (OFDM sub-carrier). In such a case, distinct shaping filters are required for the two signals. Rather than use a single shaping filter designed in an attempt to address the requirements of both signals, the multi building block architecture 100 of FIG. 1 may be arranged such that the two signals are handled by two distinct sub-band building blocks 102 and that the sub-band building blocks 102 are configured in a manner specific to the requirements of each of the two signals. The filtering of the two 20 MHz signals may also be "timing shared" by using a single physical sub-band building block 102 and two different sets of shaping filter coefficients.

For a third example, again consider that the target wideband signal that is to be generated includes two signals. The two signals have distinct bandwidth. Accordingly, distinct shaping filters and distinct rate change filters are required for the two signals. Rather than use a single shaping filter designed in an attempt to address the requirements of both signals, the multi building block architecture 100 of FIG. 1 may be arranged such that the two signals are handled by two distinct sub-band building blocks 102 and that the sub-band building blocks 102 are configured in a manner specific to the requirements of each of the two signals.

Figure 15:
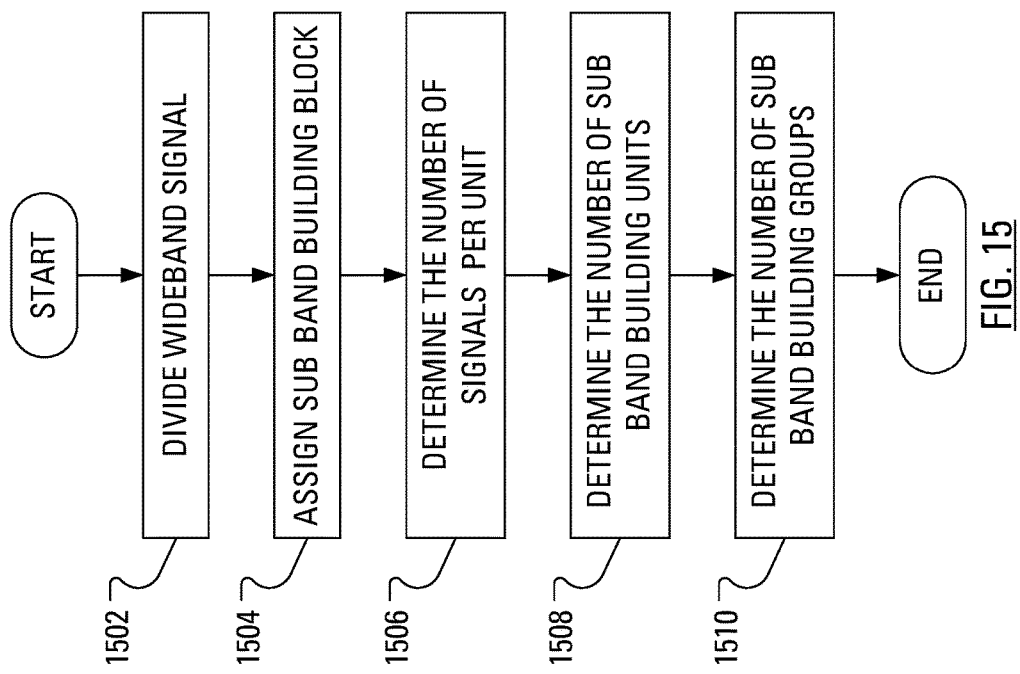
FIG. 15 illustrates example steps in a method of configuring the configurable multi building block architecture of FIG. 1.

FIG. 15 illustrates example steps in a method of configuring the configurable multi building block architecture 100 of FIG. 1. The steps may be carried out by a processor, configuring the architecture 100 of FIG. 1 for itself or to employ various hardware elements.

For configuring the architecture 100 of FIG. 1 when the first target wideband signal 1300A of FIG. 13A, the second target wideband signal 1300B of FIG. 13B or the third wideband signal 1300C of FIG. 13C is the goal, the processor may divide (step 1502) the target wideband signal 1300A, 1300B, 1300C into multiple sub-bands to reduce filter complexity and reduce use of processing resources. Each sub-band can be same bandwidth or different bandwidth. The processor may then assign (step 1504) the generation of each sub-band to one of the sub-band building blocks 102. The assigning (step 1504) may, for example, take into account sub-band signal bandwidth and act to group sub-bands having the same signal bandwidth in the given sub-band building block 102. The processor may then determine (step 1506) a number of signals per sub-band building block 102. The number of signals generated within a sub-band building block 102 may be determined by rounding down a quotient of a/b to a nearest integer, where "a" is clock rate (processor or hardware operating clock) and "b" is a single sample processing rate by the sub-band building block 102. The processor may then determine (step 1508) a number of sub-band building units 116. The determining (step 1508) may be accomplished by rounding up the quotient of c/d to a nearest integer, where "c" is total number of signals and "d" is a number of signals by a sub-band building unit. The processor may then determine (step 1510) a number of sub-band building groups 118. The number of sub-band building groups 118 may, for example, be determined (step 1510) in depending upon a number of different sampling rates.

For configuring the architecture 100 of FIG. 1 when one of either the second target wideband signal 1300B of FIG. 13B, the third target wideband signal 1300C of FIG. 13C, the fourth target wideband signal 1400A of FIG. 14, the fifth target wideband signal 1400B of FIG. 14B or the sixth target wideband signal 1400C of FIG. 14C is the goal, the processor may bypass the dividing step (step 1502) and begin with the assigning step (step 1504).

Figure 16:
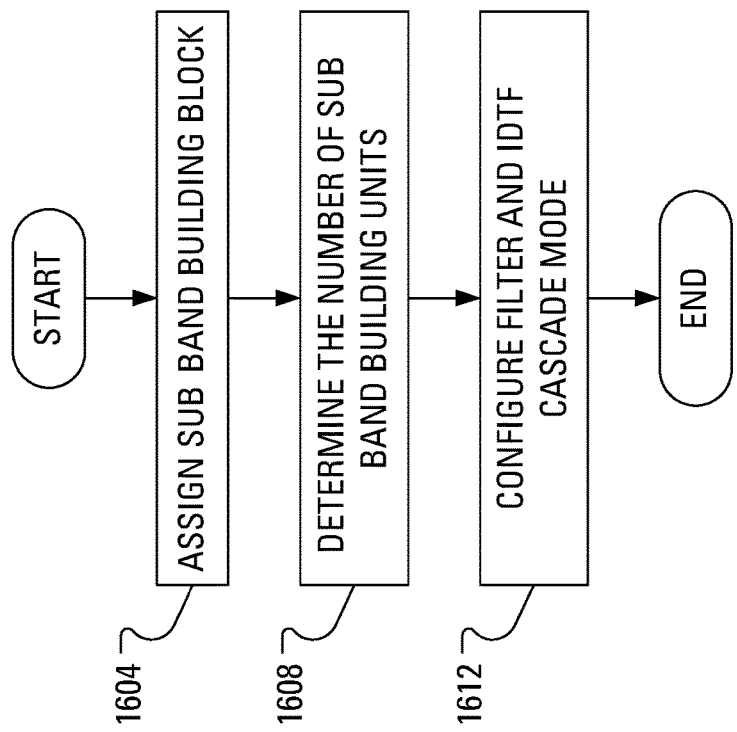
FIG. 16 illustrates example steps in a method of configuring the configurable multi building block architecture of FIG. 1.

FIG. 16 illustrates example steps in a method of configuring the configurable multi building block architecture 100 of FIG. 1.

For configuring the architecture 100 of FIG. 1 when the fourth target wideband signal 1400A of FIG. 14 is the goal, the processor may, again, bypass a dividing step and begin by assigning (step 1604) the generation of a sub-band to a single sub-band building block 102. The processor may then determine (step 1608) a number of sub-band building units 116. The determining (step 1508) whether to use a single sub-band building unit 116 or multiple sub-band building units 116 may be based upon signal sampling rate and operating clock rate. The determining (step 1508) may further be accomplished by rounding up the quotient of e/f to a nearest integer, where "e" is sampling rate and "f" is a single sample processing rate by the sub-band building block 102. The processor may then configure (step 1612) a filter cascade mode and an IDTF cascade mode.

The configurable multi building block architecture 100 of FIG. 1 may also be seen to enable generation of a wideband signal directly, that is, without dividing to sub-carrier band. In such a case, the configurable multi building block architecture 100 of FIG. 1 may employ a configuration featuring a cascade of shaping filters. Indeed, the shaping filter 114 may be formed as a cascade of filters, the shaping filter 114 and the rate change filter 402 may be cascaded, the wideband upsampling filter 124 may include a cascade of filter phases 802 as illustrated in FIG. 8 and the shaping filter 114, the rate change filter 402 and the wideband upsampling filter 124 may be cascaded together.

Figure 17:
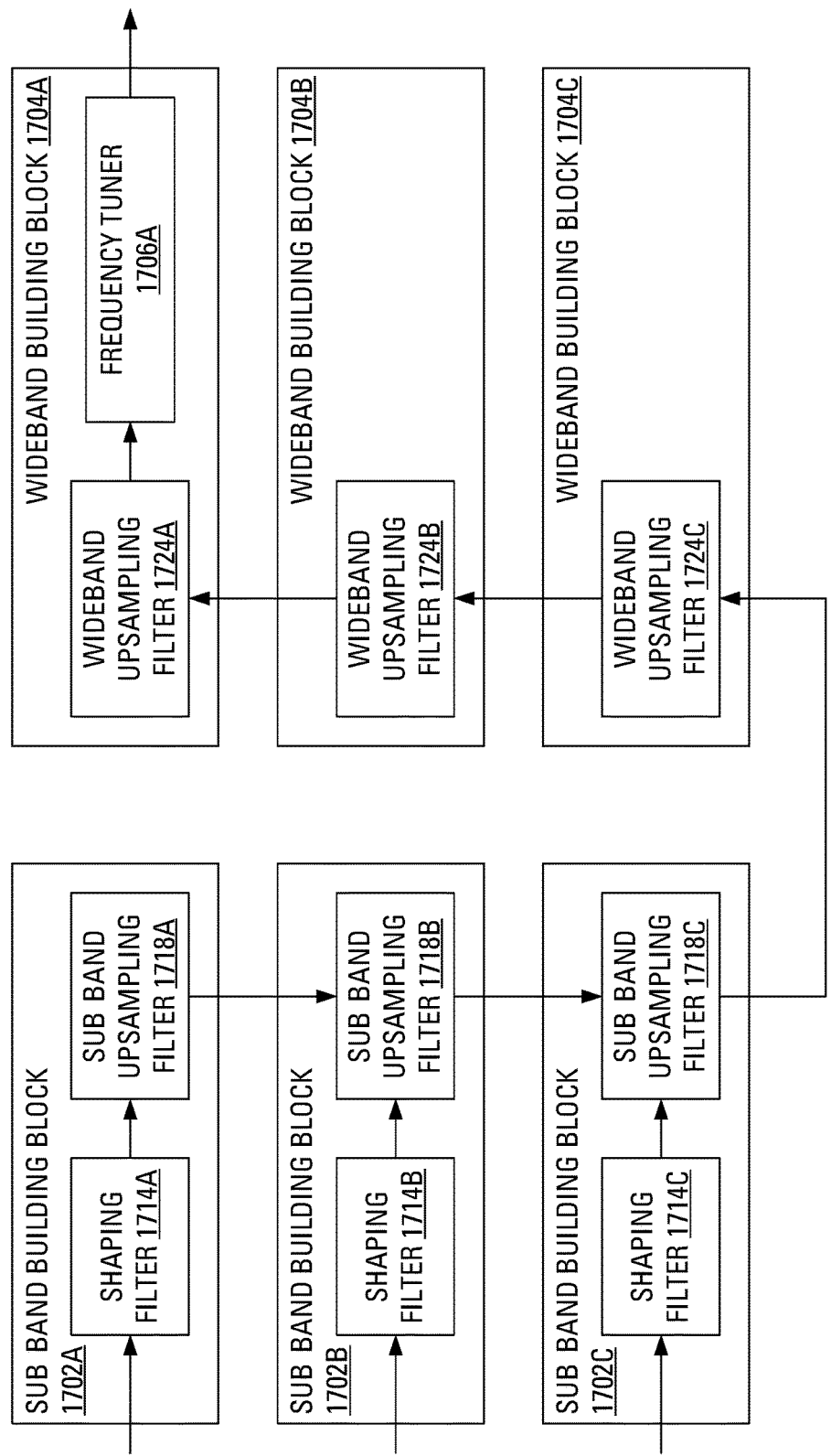
FIG. 17 illustrates an example cascade configuration of elements of the configurable multi building block architecture of FIG. 1.

FIG. 17 illustrates an example cascade configuration of elements. Included in FIG. 17 are a first sub-band building block 1702A, a second sub-band building block 17026 and a third sub-band building block 1702C. The first sub-band building block 1702A includes a first shaping filter 1714A and a first sub-band upsampling filter 1718A. The second sub-band building block 1702B includes a second shaping filter 1714B and a second sub-band upsampling filter 1718B. The third sub-band building block 1702C includes a third shaping filter 1714C and a third sub-band upsampling filter 1718C.

Also illustrated are a first wideband building block 1704A, a second wideband building block 1704B and a third wideband building block 1704C. The first wideband building block 1704A includes a first wideband upsampling filter 1724A and a frequency tuner 1706A. The second wideband building block 1704B includes a second wideband upsampling filter 1724B. The third wideband building block 1704C includes a third wideband upsampling filter 1724C.

In operation, output from the first shaping filter 1714A may be received at the first sub-band upsampling filter 1718A, filtered and the output passed to the second sub-band upsampling filter 1718B. At the second sub-band upsampling filter 17186, the output from the first sub-band upsampling filter 1718A and the second shaping filter 1714B is received, filtered and the output passed to the third sub-band upsampling filter 1718C. At the third sub-band upsampling filter 1718C, the output from the second sub-band upsampling filter 1718B and the third shaping filter 1714C is received, filtered and the output passed to the third wideband upsampling filter 1724C. At the third wideband upsampling filter 1724C, the output from the third sub-band upsampling filter 1718C is received, filtered and the output passed to the second wideband upsampling filter 1724B. At the second wideband upsampling filter 1724B, the output from the third wideband upsampling filter 1724C is received, filtered and the output passed to the first wideband upsampling filter 1724A. At the first wideband upsampling filter 1724A, the output from the second sub-band upsampling filter 1718B is received, filtered and the output passed to the frequency tuner 1706A. From the frequency tuner 1706A, processing continues as described hereinbefore with reference to FIG. 9.

Conveniently, the configurable multi building block architecture 100 of FIG. 1 may be seen to enable generation of various bandwidth waveforms for 5G wireless systems. Furthermore, the configurable multi building block architecture 100 of FIG. 1 may also be seen to reduce filter design requirement by using multi-stage and multi-building block architecture. Additionally, the configurable multi building block architecture 100 of FIG. 1 may also be seen to enable independent OFDM parameters for each sub-band, thereby allowing for flexible configuration for different applications and requirements. More particularly, the configurable multi building block architecture 100 of FIG. 1 may also be seen to allow for independent and flexible shaping filters 114 for individual sub-bands.

With traditional architecture, it may be considered that it would be difficult to generate the sub-band group 1100A illustrated in FIG. 11A. Notably, the transition bandwidth of the target wideband signal is very small. The architecture 100 (FIG. 1) involves dividing the target wideband signal into sub-bands, thereby reducing complexity of the shaping filter. This also reduces the sampling rate due to narrow band signal so that it may be considered that the architecture 100 enables the implementation of resource sharing.

It also may be noted that traditional architecture fails to enable generation of a target wideband signal having a mix of OFDM parameters. In part, due to the division, proposed herein, of a target wideband signal into several sub-bands, the individual sub-bands can be associated with different OFDM parameters. Furthermore, shaping filters may be customized for the sub-bands by configuring OFDM parameter and filter coefficients.

The use of multiple stages and multiple building blocks enables the architecture 100 to flexibly generate various target wideband signals. The architecture 100 also enables resource sharing through the division of the target wideband waveform into sub-band signals. The architecture 100 may be seen to enable the implementation of resource sharing schemes, cascade configurations and the powering down of unused blocks.

Figure 18:
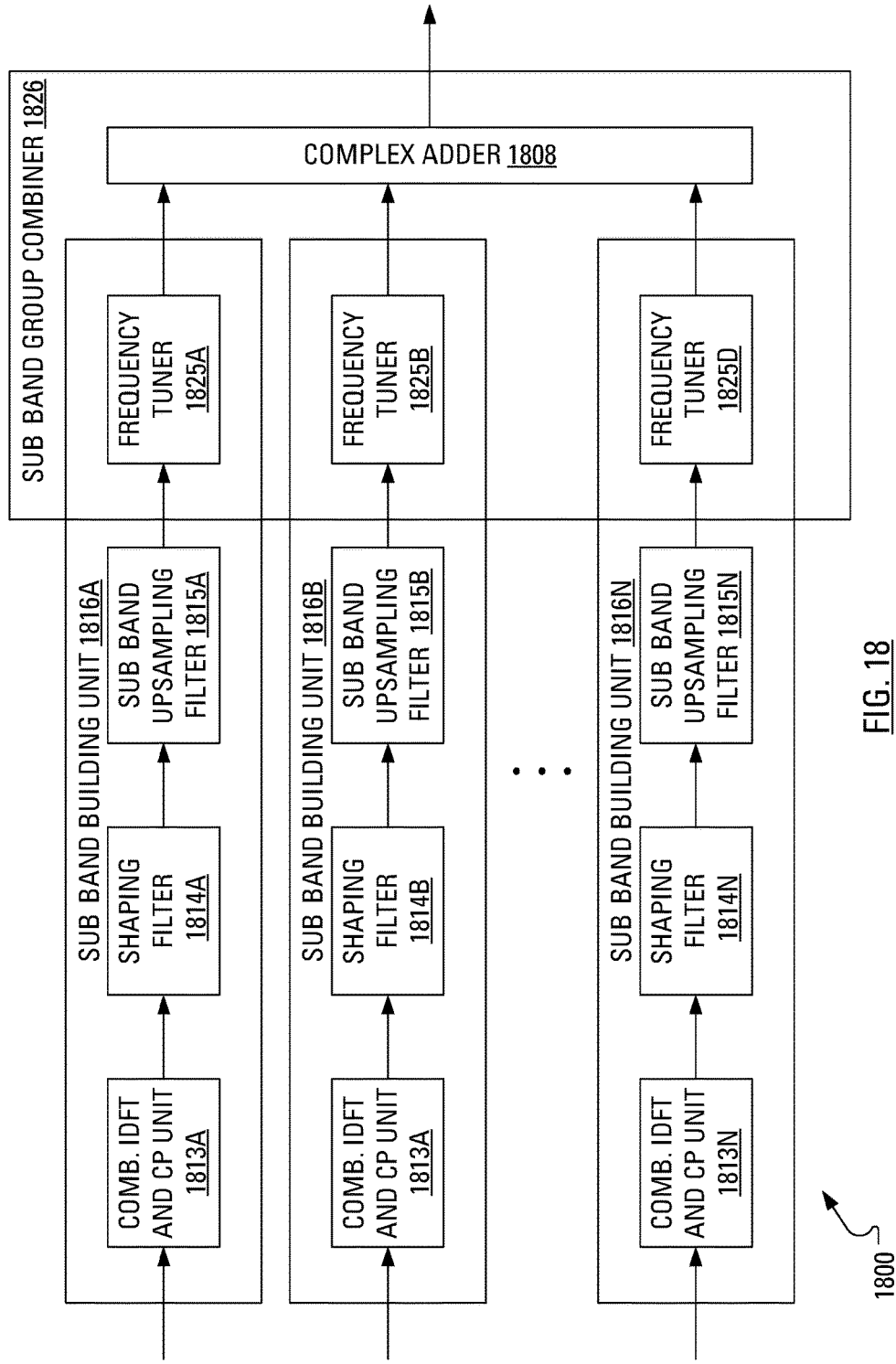
FIG. 18 illustrates a sub-band building block with some alteration when compared to the sub-band elements of the multi building block device of FIG. 1.

FIG. 18 illustrates a sub-band building block 1800 with some alteration when compared to the sub-band elements of the multi building block device 100 of FIG. 1. The sub-band building block 1800 includes a sub-band group combiner 1826.

The sub-band building block 1800 of FIG. 18 is illustrated as including three example sub-band building units (collectively or individually referenced as 1816), among a potential plurality of sub-band building units: a first sub-band building unit 1816A; a second sub-band building unit 1816B; and an Nth sub-band building unit 1816N. A particular difference may be noted relative to the multi building block device 100 of FIG. 1 in that the IDFT unit 110 and the CP unit 112 are combined into a single, combined IDFT and CP unit.

The first sub-band building unit 1816A includes a first combined IDFT and CP unit 1813A, a first shaping filter 1814A and a first sub-band upsampling filter 1815A. The second sub-band building unit 1816B includes a second combined IDFT and CP unit 1813B, a second shaping filter 1814B and a second sub-band upsampling filter 18156. The Nth sub-band building unit 1816N includes an Nth combined IDFT and CP unit 1813N, an Nth shaping filter 1814N and an Nth sub-band upsampling filter 1815N.

The sub-band group combiner 1826 includes a complex adder 1808 and a frequency tuner associated with each of the sub-band building units 1816. Indeed, output from the first sub-band upsampling filter 1815A may be received by a first frequency tuner 1825A, output from the second sub-band upsampling filter 18156 may be received by a second frequency tuner 18256 and output from the Nth sub-band upsampling filter 1815N may be received by an Nth frequency tuner 1825N. Output from the first frequency tuner 1825A, the second frequency tuner 18256 and the Nth frequency tuner 1825N may be received at the complex adder 1808.

Figure 19:
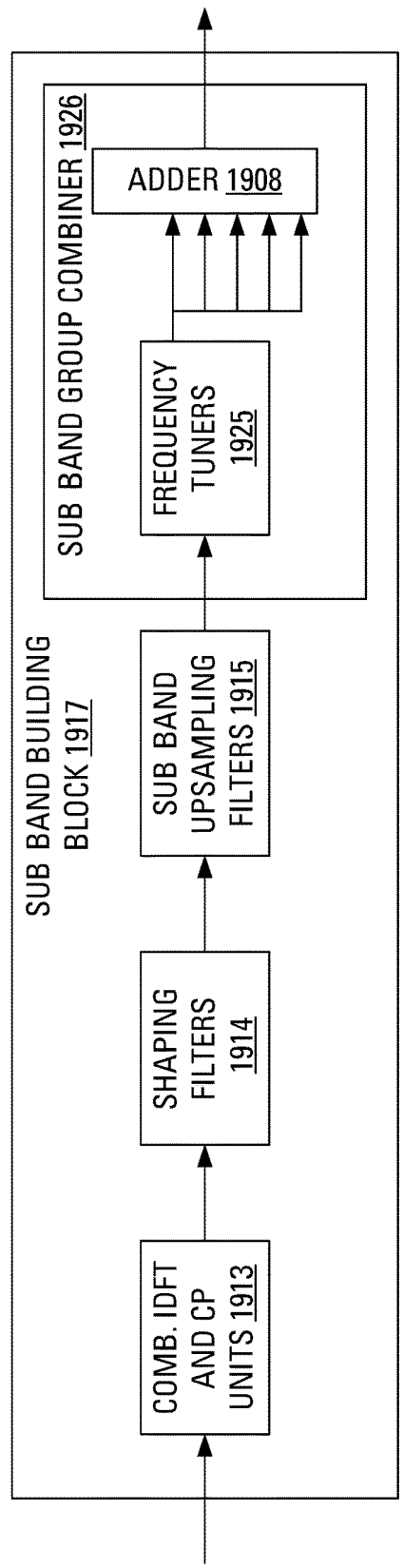
FIG. 19 illustrates a sub-band building block analogous to the sub-band building block of FIG. 18 with pluralities of elements combined to be illustrated as a single element.

Indeed, in view of FIG. 18, it is notable that, thanks to resource sharing, multiple sub-band building units 1816 may be implemented by a single, physical, sub-band building unit hardware 1816. FIG. 19 is an example of a physical sub-band building unit 1917 when resource sharing is used.

FIG. 19 illustrates the sub-band building block 1917, which is analogous to the sub-band building block 1800 of FIG. 18. However, in the representation of the sub-band building block 1917 illustrated in FIG. 19, pluralities of elements are combined to be illustrated as a single element. Indeed, a plurality of combined IDFT and CP units 1913 are illustrated as a single element. Similarly, a plurality of shaping filters 1914 are illustrated as a single element. Furthermore, a plurality of sub-band upsampling filters 1915 are illustrated as a single element. Within a sub-band group combiner 1926 are a plurality of frequency tuners 1925 represented by a single element and a complex adder 1908 arranged to receive a plurality of inputs from the plurality of frequency tuners 1925.

Figure 20:
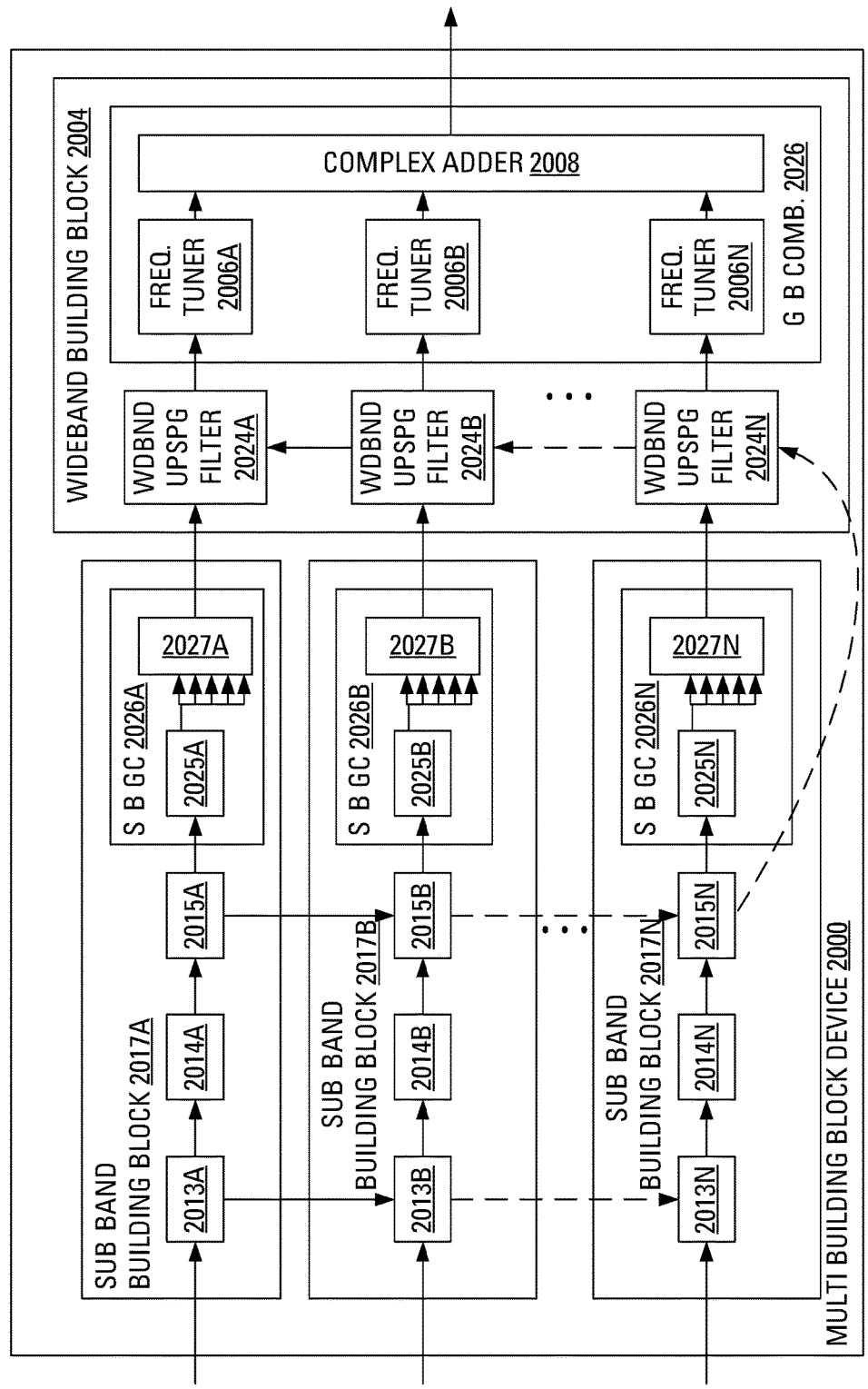
FIG. 20 illustrates a multi building block device that makes use of a plurality of sub-band building blocks of the type illustrated in FIG. 19.

FIG. 20 illustrates a multi building block device 2000 that makes use of a plurality of sub-band building blocks of the type illustrated in FIG. 19. The multi building block device 2000 includes a wideband building block that receives input from a first sub-band building block 2017A, a second sub-band building block 20176 and a plurality of other sub-band building blocks, including an Nth sub-band building block 2017N. Indeed, FIG. 20 may be considered to be a high-level block diagram illustrating a scenario wherein a single, physical sub-band building block is timing shared by all of the sub-band building blocks 2017.

In a manner in common with the sub-band building block 1917 illustrated in FIG. 19, the first sub-band building block 2017A includes a first plurality of combined IDFT and CP units 2013A, a first plurality of shaping filters 2014A, a first plurality of sub-band upsampling filters 2015A and a first sub-band group combiner 2026A. The first sub-band group combiner 2026A includes a first plurality of frequency tuners 2025A and a first complex adder 2027A. It follows that the second sub-band building block 2017B includes a second plurality of combined IDFT and CP units 2013B, a second plurality of shaping filters 2014B, a second plurality of sub-band upsampling filters 2015B and a second sub-band group combiner 2026B. The second sub-band group combiner 2026B includes a second plurality of frequency tuners 2025B and a second complex adder 2027B. It also follows that the Nth sub-band building block 2017N includes an Nth plurality of combined IDFT and CP units 2013N, an Nth plurality of shaping filters 2014N, an Nth plurality of sub-band upsampling filters 2015N and an Nth sub-band group combiner 2026N. The Nth sub-band group combiner 2026N includes an Nth plurality of frequency tuners 2025N and an Nth complex adder 2027N.

Within the wideband building block 2004 are a wideband upsampling filter and a frequency tuner associated with each of the plurality of sub-band building blocks 2017. Indeed, there is a first wideband upsampling filter 2024A and a first frequency tuner 2006A associated with the first sub-band building block 2017A, a second wideband upsampling filter 2024B and a second frequency tuner 2006B associated with the second sub-band building block 2017B and an Nth wideband upsampling filter 2024N and an Nth frequency tuner 2006N associated with the Nth sub-band building block 2017N. The output of the frequency tuners 2006 is received by a complex adder 2008, whose output is the output of the multi building block device 2000.

As illustrated in FIG. 17, there may be occasions wherein a configuration of cascaded filters is preferred. As a consequence of such a cascade being configured in the multi building block device 2000 of FIG. 20, elements of the multi building block device 2000 (such as the sub-band group combiners 2026) may be bypassed.

In operation, output from the first plurality of combined IDFT and CP units 2013A may be received at the second plurality of combined IDFT and CP units 2013B. At the second plurality of combined IDFT and CP units 2013B, the output from the first plurality of combined IDFT and CP units 2013A is received, processed and the output passed to the next plurality of combined IDFT and CP units. At the Nth plurality of combined IDFT and CP units 2013N, the output from the N−1th plurality of combined IDFT and CP units is received, processed and the output passed to the Nth plurality of shaping filters 2014N.

Similarly, output from the first plurality of sub-band upsampling filters 2015A may be received at the second plurality of sub-band upsampling filters 2015B. At the second plurality of sub-band upsampling filters 2015B, the output from the first plurality of sub-band upsampling filters 2015A is received, filtered and the output passed to the next plurality of sub-band upsampling filters. At the Nth plurality of sub-band upsampling filters 2015N, the output from the N−1th plurality of sub-band upsampling filters is received, filtered and the output passed to the Nth wideband upsampling filter 2024N.

At the Nth wideband upsampling filter 2024N, the output from the Nth plurality of sub-band upsampling filters 2015N is received, filtered and the output passed to the N−1th wideband upsampling filter. At the second wideband upsampling filter 2024B, output from the third wideband upsampling filter (not shown) is received, filtered and the output passed to the first wideband upsampling filter 2024A. At the first wideband upsampling filter 2024A, the output from the second wideband upsampling filter 2024B is received, filtered and the output passed to the first frequency tuner 2006A. From the first frequency tuner 2006A, output is passed to the complex adder 2008.

Embodiment 1

A configurable multiple stage architecture for generating a target wideband waveform for use in a wireless communication system, the architecture for implementation on a processing device, the architecture comprising: a plurality of sub-band building blocks, each block of the plurality of sub-band building blocks adapted to generate a respective sub-band signal, with a respective set of parameters, among a plurality of sub-band signals; and a wideband building block adapted to filter and aggregate the plurality of sub-band signals to generate the target wideband waveform.

Embodiment 2

The architecture of embodiment 1 wherein the target wideband waveform includes the plurality of sub-band signals and wherein at least two of the plurality of sub-band signals have distinct bandwidths.

Embodiment 3

The architecture of embodiment 1 wherein each of the plurality of sub-band signals includes associated guard bands.

Embodiment 4

The architecture of embodiment 1 wherein only outer sub-bands of the plurality of sub-band signals have an associated guard band.

Embodiment 5

A method of generating a target wideband waveform, The method comprising: receiving a stream of data; converting, within a transmit buffer, the stream of data to a plurality of parallel streams of binary data that may be represented as a corresponding plurality of narrow band signals; generating, at each sub-band building block of a plurality of sub-band building blocks, a respective sub-band signal with a respective set of parameters; and filtering, at a wideband building block, the plurality of sub-band signals to produce a plurality of filtered sub-band signals; and aggregating, at the wideband building block, the plurality of filtered sub-band signals to generate the target wideband waveform.

The above-described implementations of the present application are intended to be examples only. Alterations, modifications and variations may be effected to the particular implementations by those skilled in the art without departing from the scope of the application, which is defined by the claims appended hereto.

What is claimed is:

1. A wireless communication device having a processing device, the processing device being configured to generate a target waveform by implementing a configurable multiple building block architecture comprising:
   a plurality of sub-band building blocks, each of the plurality of sub-band building blocks adapted to form a sub-band group signal such that a plurality of sub-band group signals are formed; and
   each of the plurality of sub-band building blocks further adapted to:
      receive one or more frequency domain signals to be combined into the target waveform;
      employ one or more sub-band building units, each sub-band building unit being independently configurable to build a respective sub-band with independent parameters by:
         receiving a given frequency domain signal among the one or more frequency domain signals;
         transforming the given frequency domain signal to a time domain signal; and
         filtering the time domain signal;
      each sub-band building unit being independently configurable to use independent parameters that are selectable to differ between at least two sub-bands;
      employ a sub-band group building block to form the sub-band group signal comprising one or more sub-bands outputted by the one or more sub-band building units; and
   a wideband building block adapted to receive the plurality of sub-band group signals from the plurality of sub-band building blocks and combine the plurality of sub-band group signals into the target waveform.

2. The wireless communication device according to claim 1 wherein a first shaping filter for the filtering the time domain signal for a first sub-band building unit performs shape filtering that is different from a second shaping filter for the filtering the time domain signal for a second sub-band building unit.

3. The wireless communication device according to claim 1 wherein a first bandwidth associated with a first sub-band is distinct from a second bandwidth associated with a second sub-band.

4. The wireless communication device according to claim 1 wherein a first number of subcarriers associated with a first sub-band is distinct from a second number of subcarriers associated with a second sub-band.

5. The wireless communication device according to claim 1 wherein a first sub-carrier space associated with a first sub-band is distinct from a second sub-carrier space associated with a second sub-band.

6. The wireless communication device according to claim 1 wherein a first number of guard tones associated with a first sub-band is distinct from a second number of guard tones associated with a second sub-band.

7. The wireless communication device according to claim 1 wherein, for at least one sub-band building unit, the transforming the frequency domain signals to the time domain signals comprises employing a plurality of inverse discrete Fourier transform units, wherein at least two inverse discrete Fourier transform units are connected in a cascade arrangement.

8. The wireless communication device according to claim 1 wherein the wideband building block is further adapted to:
employ a plurality of upsampling filters, each upsampling filter adapted to filter a respective sub-band group signal, thereby resulting in a plurality of filtered sub-band group signals; and
combine the plurality of filtered sub-band group signals into the target waveform.

9. The wireless communication device according to claim 8 wherein a given upsampling filter employs a plurality of cascaded filter phases and wherein at least two upsampling filters among the plurality of upsampling filters are cascaded in that the given upsampling filter is adapted to receive output from a further upsampling filter among the plurality of upsampling filters.

10. The wireless communication device according to claim 1 wherein each of the plurality of sub-band building blocks includes a shaping filter and a sub-band upsampling filter for filtering the time domain signal.

11. The wireless communication device according to claim 10 wherein the shaping filter is among a plurality of shaping filters, the sub-band upsampling filter is among a plurality of sub-band upsampling filters, and the plurality of shaping filters and the plurality of sub-band upsampling filters can be configured together in a cascade to form a single amalgamated shaping filter.

12. The wireless communication device according to claim 10 wherein output from the sub-band upsampling filter is received at a given upsampling filter among the plurality of upsampling filters.

13. A method of generating a target waveform for use in a wireless communication device, the method comprising implementing a configurable multiple building block architecture by:
implementing a plurality of sub-band building blocks, each sub-band building block forming a respective one of a plurality of sub-band group signals by:
receiving one or more frequency domain signals to be combined into the target waveform;
implementing one or more sub-band building units, each sub-band building unit being independently configurable to generate a respective sub-band with independent parameters by:
receiving a given frequency domain signal among the one or more frequency domain signals;
transforming the given frequency domain signal to a given time domain signal; and
filtering the given time domain signal; and
each sub-band building unit being independently configurable to use independent parameters that are selectable to differ between at least two sub-bands;
combining one or more sub-bands outputted by the one or more sub-band building units to form a sub-band group signal; and
combining the plurality of sub-band group signals into the target waveform.

14. The method according to claim 13 further comprising:
assigning generation of each sub-band to a respective sub-band building block; and
determining a number of sub-band building units for each sub-band building block.

15. The method of claim 14 wherein the assigning takes into account sub-band group signal bandwidth and acts to group sub-bands having the same signal bandwidth in the sub-band building block.

16. The method of claim 14 wherein the determining number of sub-band building units comprises rounding up, to a nearest integer, a quotient formed by dividing a total number of sub-bands by a number of signals processed by each sub-band building unit.

17. The method of claim 14 further comprising dividing the target wideband signal into the plurality of sub-bands.

18. The method of claim 15 wherein each sub-band has the same bandwidth.

19. The method of claim 15 wherein at least two of the sub-bands have distinct bandwidths.

20. The method of claim 14 further comprising determining a number of signals per sub-band building block.

21. The method of claim 14 wherein the determining the number of sub-bands to be processed by a single unit comprises rounding down, to a nearest integer, a quotient formed by dividing a clock rate by single samples of sub-band processing rate.

22. The method of claim 14 further comprising determining a number of sub-band building groups.

23. The method of claim 22 wherein determining the number of sub-band building groups depends upon a quantity of different sampling rates.

* * * * *